US010396926B2

United States Patent
Xiong et al.

(10) Patent No.: US 10,396,926 B2
(45) Date of Patent: Aug. 27, 2019

(54) APPARATUS AND METHOD FOR SUPPRESSING INTER-CELL INTERFERENCE IN WIRELESS COMMUNICATION SYSTEM

(71) Applicant: Samsung Electronics Co., Ltd., Gyeonggi-do (KR)

(72) Inventors: Qi Xiong, Beijing (CN); Bin Yu, Beijing (CN); Chen Qian, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/681,199

(22) Filed: Aug. 18, 2017

(65) Prior Publication Data

US 2018/0054270 A1 Feb. 22, 2018

(30) Foreign Application Priority Data

Aug. 19, 2016 (CN) .......................... 2016 1 0697505
Aug. 18, 2017 (KR) ........................ 10-2017-0104660

(51) Int. Cl.
*H04L 5/00* (2006.01)
*H04B 7/024* (2017.01)
(Continued)

(52) U.S. Cl.
CPC .......... *H04J 11/0053* (2013.01); *H04B 7/024* (2013.01); *H04B 7/0417* (2013.01);
(Continued)

(58) Field of Classification Search
CPC combination set(s) only.
See application file for complete search history.

(56) References Cited

U.S. PATENT DOCUMENTS

2007/0280170 A1* 12/2007 Kawasaki ......... H04W 72/1231
370/331
2007/0280175 A1* 12/2007 Cheng .................... H04B 7/022
370/338

(Continued)

OTHER PUBLICATIONS

International Telecommunications Union; "SWG Traffic: IMT Traffic Estimates Beyond Year 2020"; Radiocommunication Study Groups; Document 5D/TEMP/466-E; Oct. 21, 2014; 35 pages.

(Continued)

*Primary Examiner* — Ganiyu A Hanidu

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides a method and device for suppressing an inter-cell interference. The method includes receiving, from an adjacent BS, information associated with a first multiple access resource configured for a serving terminal of the adjacent BS and configuring a second multiple access resource for a serving terminal of the BS based on the information of the first multiple access resource. The method also includes transmitting, to the serving terminal of the BS, information associated with the second multiple access resource and receiving, from the serving terminal of the BS, data allocated based on the second multiple access resource, wherein the second multiple access resource is different from the first multiple access resource.

20 Claims, 22 Drawing Sheets

(51) Int. Cl.
  *H04B 7/0417* (2017.01)
  *H04J 11/00* (2006.01)
  *H04L 25/02* (2006.01)
  *H04B 7/0456* (2017.01)

(52) U.S. Cl.
  CPC ............ *H04L 5/005* (2013.01); *H04B 7/0456*
                  (2013.01); *H04L 25/0204* (2013.01)

(56) References Cited

U.S. PATENT DOCUMENTS

| | | | | |
|---|---|---|---|---|
| 2009/0181708 | A1* | 7/2009 | Kim | H04B 7/026 |
| | | | | 455/501 |
| 2009/0247181 | A1* | 10/2009 | Palanki | H04L 1/0036 |
| | | | | 455/452.2 |
| 2012/0163228 | A1* | 6/2012 | Sung | H04W 52/146 |
| | | | | 370/252 |
| 2013/0077578 | A1* | 3/2013 | Wang | H04W 72/1278 |
| | | | | 370/329 |
| 2017/0026151 | A1* | 1/2017 | Adachi | H04W 72/005 |
| 2017/0048841 | A1* | 2/2017 | Hwang | H04L 5/0044 |
| 2017/0280467 | A1* | 9/2017 | Zhu | H04W 72/0426 |
| 2017/0310417 | A1* | 10/2017 | Jung | H04L 1/18 |
| 2018/0048348 | A1* | 2/2018 | Gau | H04L 5/0037 |

OTHER PUBLICATIONS

International Telecommunications Union; "Future Technology Trends of Terrestrial IMT Systems—M Series Mobile, Radiodeterrnination, Amateur and Related Satellite Services"; Radiocommunication Sector of ITU; Report ITU-R M.2320-0; Nov. 2014; 32 pages.

International Telecommunications Union; "IMT Vision—Framework and Overall Objectives of the Future Development of IMT for 2020 and Beyond"; Radiocommunication Sector of ITU; Recommendation ITU-R M.2083-0; Sep. 2015; 21 pages.

Ping et al.; "Interleave-Division Multiple-Access"; IEEE Transactions on Wireless Communicatons; vol. 5, No. 4; Apr. 2006; 10 pages.

* cited by examiner

APPARATUS AND METHOD FOR SUPPRESSING INTER-CELL INTERFERENCE IN WIRELESS COMMUNICATION SYSTEM

CROSS-REFERENCE TO RELATED APPLICATION AND CLAIM OF PRIORITY

This application is related to and claims priority to Chinese Patent Application No. 201610697505.7 filed on Aug. 19, 2016, and Korean Patent Application No. 10-2017-0104660 filed on Aug. 18, 2017, the contents of which are incorporated herein by reference.

TECHNICAL FIELD

The present disclosure generally relates to wireless communication technologies, and more particularly to the apparatus and method for suppressing inter-cell interference in wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Accompanying with rapid developments of information industry, particularly increasing requirements coming from mobile Internet and internet of things (IoT), unprecedented challenges have been brought to future mobile communication technologies. For example, based on the report International Telecommunications Union-Radio Communications sector (ITU-R) M.[IMT.BEYOND 2020.TRAFFIC] of ITU, it can be predicted that by 2020, mobile traffic will grow nearly 1000 times compared with year 2010 (fourth generation mobile communication technology (4G) era), number of connected user equipment (UE) will be more than 17 billion. With massive IoT devices gradually penetrate into the mobile communication network, number of connected UEs may be more amazing. In response to this unprecedented challenge, communications industry and academia have launched a wide range of 5G research, for 2020s. At present, the report ITU-R M.[IMT.VISION] made by ITU has discussed framework and overall objectives of future 5G, and has provided a detailed description for demand outlook, application scenario and each important performance index. In response to new demands in 5G, the report ITU-R M.[IMT.FUTURE TECHNOLOGY TRENDS] made by ITU provides information about technology tendency of 5G, which aims to solve significant problems, such as significant improvement of system throughput, consistent user experience, expansibility, so as to support IoT, delay, energy efficiency, costs, network flexibility, support of emerging services, and flexible spectrum usage, and so on.

To be faced with more diverse service scenarios of 5G, flexible multiple access technologies are needed to support different scenarios and service requirements. For example, in the face of various service scenarios with massive connections, how to access more users with limited resources becomes a core problem needing to be solved by 5G multiple access technologies. Current 4G LTE network mainly adopts an Orthogonal Frequency Division Multiplexing (OFDM)-based multiple access technologies. However, it is obvious that current orthogonal-based access mode is difficult to meet the following requirements for 5G: spectral efficiency is increased by 5 to 15 times, and user access number per square kilometer area may reach one million. By reusing the same resources with multiple users, supported number of user connections may be greatly improved by Non-Orthogonal Multiple Access (NOMA) technologies. Since users have more chances to access a network, the overall throughput and spectrum efficiency of the network may be improved. In addition, in the face of massive Machine Type Communication (mMTC) scenarios, take into account of cost and realization complexity of a terminal, multiple access technologies with more simple operation and process are necessary to be used. In the face of low-latency or low-power service scenarios, when adopting NOMA technologies, access requirements of massive users may be better met. However, when adopting access modes of non-orthogonal multiple access resources, severe interference may be generated among each cell, particularly in a case where no individualized processing has been performed to multiple access resources employed by adjacent cells, under the circumstances that two adjacent cells use the same multiple access resources, and transmit signals with the same frequency band. Meanwhile, when adopting NOMA, from one aspect, number of served users may be improved; from another aspect, interference in a system environment may also be increased, e.g., interference level generated by users of an adjacent cell to current cell may be increased significantly.

At present, the NOMA technologies under research mainly include: Multiple User Shared Access (MUSA), NOMA, Pattern Division Multiple Access (PDMA), Sparse Code Multiple Access (SCMA), Interleave Division Multiple Access (IDMA), and so on. MUSA distinguishes users with code word. SCMA distinguishes users with codebook. NOMA distinguishes users with power. PDMA distinguishes users with different characteristic patterns. IDMA distinguishes users with interleaved sequence.

When applying current NOMA (SCMA, IDMA and so on) to a practical cellular communication system, number of users served simultaneously in a cell may be greatly improved. The problem brought at the same time is as follows. Accompanying with increasing number of users served in a cell, inter-cell interferences may also be significantly increased. Subsequently, Quality of Service (QoS) obtained by users in the cell, particularly QoS of users at the cell edge, may be affected seriously. Current network does not process the following problem. After applying NOMA, more users have been accessed, while inter-cell interferences have been increased.

SUMMARY

To address the above-discussed deficiencies, it is a primary object to provide an inter-cell interference suppression method and device, so as to suppress inter-cell interferences.

The present disclosure provides a method for operating a base station (BS), including: receiving, from an adjacent BS, information associated with a first multiple access resource configured for a serving terminal of the adjacent BS; configuring a second multiple access resource for a serving terminal of the BS based on the information of the first multiple access resource; transmitting, to the serving terminal of the BS, information associated with the second multiple access resource; receiving, from the serving terminal of the BS, data allocated based on the second multiple access resource, wherein the second multiple access resource is different from the first multiple access resource.

The present disclosure provides an apparatus for operating a base station (BS), including: a transceiver configured to receive, from an adjacent BS, information associated with a first multiple access resource configured for a serving terminal of the adjacent BS; at least one processor configured to configure a second multiple access resource for a serving terminal of the BS based on the information of the first multiple access resource, wherein the transceiver is further configured to: transmit, to the serving terminal of the BS, information associated with the second multiple access resource, and receive, from the serving terminal of the BS, data allocated based on the second multiple access resource, and wherein the second multiple access resource is different from the first multiple access resource.

According to various embodiments, the present disclosure provides a method for suppressing an inter-cell interference, including: configuring different multiple access resource sets for a target BS and an interfering BS; informing a user within a cell served by the target BS, by the target BS, information of configured multiple access resources, which are adopted by the user within the cell to transmit signals; detecting and decoding, by the target BS, a received signal; and obtaining, by the target BS, data of a target user after suppressing interferences.

According to various embodiments, when there are N multiple access resource identities (IDs) in a multiple access (MA) scheme used by the target BS and the interfering BS, N≥1, configuring different multiple access resource sets for the target BS and the interfering BS includes: configuring different $n^{th}$ multiple access resource ID sets for the target BS and the interfering BS, so as to differentiate a cell to which a user belongs, wherein 0<n≤N; or, configuring different m combination sets of multiple access resource ID for the target BS and the interfering BS, so as to differentiate a cell to which a user belongs, wherein 0<m≤N.

According to various embodiments, a method for configuring different $n^{th}$ multiple access resource ID sets for the target BS and the interfering BS includes: firstly configuring orthogonal multiple access resources for the target BS and the interfering BS; when there is no orthogonal multiple access resource, firstly configuring semi-orthogonal multiple access resources for the target BS and the interfering BS; when there is no orthogonal multiple access resource and semi-orthogonal multiple access resource, configuring non-orthogonal multiple access resources for the target BS and the interfering BS.

According to various embodiments, when time-frequency Resource Elements (REs) occupied by data are not overlapped at all, wherein the data is obtained by processing the same data with two different multiple access resources, the two different multiple access resources are orthogonal multiple access resources; when REs occupied by data are partially-overlapped, wherein the data is obtained after processing the same data with two different multiple access resources, the two different multiple access resources are semi-orthogonal multiple access resources; when REs occupied by data are completely overlapped, wherein the data is obtained after processing the same data with two different multiple access resources, the two different multiple access resources are non-orthogonal multiple access resources.

According to various embodiments, a rule for configuring different m combination sets of multiple access resource ID for the target BS and the interfering BS includes: firstly configuring an orthogonal multiple access resource combination for the target BS and the interfering BS; when there is no orthogonal multiple access resource combination, firstly configuring a semi-orthogonal multiple access resource combination for the target BS and the interfering BS; when there is no orthogonal multiple access resource combination, and semi-orthogonal multiple access resource combination, configuring a non-orthogonal multiple access resource combination for the target BS and the interfering BS.

According to various embodiments, when REs occupied by data are not overlapped at all, wherein the data is obtained after processing the same data with two different combinations of multiple access resources, the two different combinations of multiple access resources are orthogonal multiple access resource combinations; when REs occupied by data are partially-overlapped, wherein the data is obtained after processing the same data with two different combinations of multiple access resources, the two different combinations of multiple access resources are semi-orthogonal multiple access resource combinations; when REs occupied by data are completely overlapped, wherein the data is obtained after processing the same data with two different combinations of multiple access resources, the two different combinations of multiple access resources are non-orthogonal multiple access resource combinations.

According to various embodiments, the method further includes: when the target BS and the interfering BS are not configured with orthogonal multiple access resources, or orthogonal multiple access resource combinations, obtaining, by the target BS, an interference indication from the interfering BS, and performing a joint detection and decoding to a combined signal of the target user and an interfering user; wherein obtaining the data of the target user after suppressing the inter-cell interference includes: obtaining the data of the target user after suppressing the inter-cell interference, based on a decoding result of the joint detection and decoding.

According to various embodiments, the method further includes: exchanging information between the target BS and the interfering BS, wherein exchanging information includes:

selecting, by the target BS, $m_1^{th}$ multiple access resource ID, or a combination of the $m_1^{th}$ multiple access resource ID, based on a preset condition, wherein 0<$m_1$≤N;

informing, by the target BS, the interfering BS of the selected multiple access resource ID or combination of multiple access resource IDs;

when the multiple access resource ID or combination of multiple access resource IDs selected by the target BS is available for the interfering BS, transmitting, by the interfering BS, a selected ID confirmation indication to the target BS; otherwise, transmitting, by the interfering BS, an ID reselection indication to the target BS;

after receiving the selected ID confirmation indication from the interfering BS, selecting, by the target BS, a corresponding multiple access resource or combination set of multiple access resources, based on selection in A, and informing the interfering BS about set information;

after receiving the ID reselection indication from the interfering BS, modifying, by the target BS, value of $m_1$, and returning back to A, until the target BS receives the selected ID confirmation indication from the interfering BS, or, until an interaction number between the target BS and the interfering BS has exceeded a preset maximum interaction number;

selecting, by the interfering BS, a multiple access resource or a combination set of multiple access resources, which is orthogonal, semi-orthogonal, or non-orthogonal with the multiple access resource or combination set of multiple access resources selected by the target BS, based on the multiple access resource or combination set of multiple access resources selected by the target BS.

According to various embodiments, the method further includes: exchanging information between the target BS and the interfering BS, wherein exchanging information includes: selecting, by the target BS, a multiple access resource ID and a multiple access resource set; informing, by the target BS, the interfering BS about information of the selected multiple access resource ID and multiple access resource set; selecting, by the interfering BS, a multiple access resource set, which is orthogonal, semi-orthogonal, or non-orthogonal with the multiple access resource set selected by the target BS, based on the multiple access resource ID and multiple access resource set selected by the target BS; informing, by the interfering BS, the target BS about the selected information; or, selecting, by the target BS, a multiple access resource ID combination, and a combination set of multiple access resources; informing, by the target BS, the interfering BS about information of the selected multiple access resource ID combination and combination set of multiple access resources; selecting, by the interfering BS, a combination set of multiple access resources, which is orthogonal, semi-orthogonal, or non-orthogonal with the combination set of multiple access resources selected by the target BS, based on the multiple access resource ID combination and combination set of multiple access resources selected by the target BS; and, informing, by the interfering BS, the target BS of the selected information.

According to various embodiments, the multiple access resource ID includes at least one of: a time-frequency resource, a codebook resource, an interleave pattern resource, a grid-mapping pattern resource, a complex spreading code, a codebook matrix sequence, or a De Modulation Reference Signal (DMRS) resource.

According to various embodiments, the present disclosure also provides a device for suppressing an inter-cell interference, including: a resource configuring module, an informing module, and an interference suppressing module, wherein the resource configuring module is to configure a different multiple access resource set with an interfering BS; the informing module is to inform a user within a cell about information of configured multiple access resources, which are adopted by the user to transmit signals; and, the interference suppressing module is to detect and decode a received signal, and obtain data of a target user after suppressing the inter-cell interference.

Based on foregoing technical solutions, it can be seen that, in the inter-cell interference suppression method and device provided by the present disclosure, after exchanging information between a target evolved NodeB (BS) and an interfering BS, and configuring different multiple access resource sets, probability for generating interferences between the target BS and the interfering BS may be effectively reduced. Thus, the target BS detects and decodes received signals, and obtains data of a target user after suppressing interferences.

The effects obtainable by the present disclosure are not limited to the above-mentioned effects, and other effects not mentioned herein will be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted as having the meanings equal to the contextual meanings in the relevant field of art, and are not to be interpreted as having ideal or excessively formal meanings unless clearly defined in the present disclosure. In some cases, even terms defined in the present disclosure should not be interpreted as excluding embodiments of the present disclosure.

Hereinafter, various embodiments of the present disclosure will be described from the perspective of hardware. However, various embodiments of the present disclosure include a technology that uses both hardware and software, and thus the various embodiments of the present disclosure may not exclude the perspective of software.

Hereinafter, the present disclosure relates to an apparatus and method for suppressing inter-cell interferences in a wireless communication system. Specifically, the present disclosure describes a technique for configuring non-orthogonal multiple access (NOMA) resources to suppress inter-cell interferences in a wireless communication system.

Terms used in the following descriptions, such as a term referring to variables that determine physical attributes configuring a frame, a term referring to a signal, a term referring to a channel, a term referring to control information, a term referring to network entities, and a term referring to an element of a device, are used for convenience of explanation. Accordingly, the present disclosure is not limited to the following terms, and other terms having an equivalent technical meaning may be used.

Further, the present disclosure describes various embodiments using terms used in some communication standards (e.g., 3rd Generation Partnership Project (3GPP)), but this merely corresponds to an example for explanation. Various embodiments of the present disclosure may be easily modified and applied to other communication systems as well.

Figure 1:
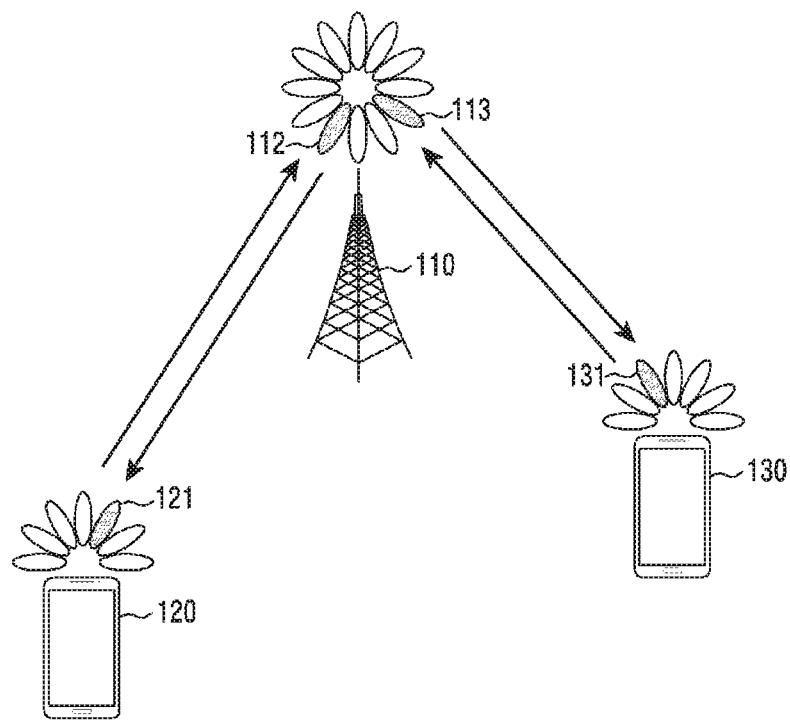
FIG. 1 illustrates a wireless communication system according to various embodiments of the present disclosure.

FIG. 1 illustrates a wireless communication system according to various embodiments of the present disclosure. FIG. 1 illustrates a base station (BS) 110, a terminal 120, and a terminal 130, as a part of nodes using a wireless channel in a wireless communication system. FIG. 1 illustrates only one base station, but may further include another base station that is identical or similar to the base station 110.

The base station 110 is a network infrastructure that provides the terminals 120 and 130 with wireless access. The base station 110 has a coverage defined by a predetermined geographic area based on the distance over which a signal may be transmitted. The base station 110 may be referred to as an "access point (AP)", an "eNodeB (eNB)", a "5th generation node (5G node)", a "wireless point", a "transmission/reception point (TRP)", or other terms having an equivalent technical meaning.

Each of the terminal 120 and the terminal 130 is an apparatus used by a user, and performs communication with the base station 110 through a wireless channel. In some cases, at least one of the terminal 120 and the terminal 130 may be operated without user involvement. That is, at least one of the terminal 120 and the terminal 130 is an apparatus that performs machine-type communication (MTC), and may not be carried by a user. Each of the terminal 120 and the terminal 130 may be referred to as a "user equipment (UE)", a "mobile station", a "subscriber station", a "remote terminal", a "wireless terminal", a "user device", or other terms having an equivalent technical meaning.

The base station 110, the terminal 120, and the terminal 130 may transmit and receive a radio signal in a millimeter wave (mmWave) band (e.g., 28 GHz, 30 GHz, 38 GHz, or 60 GHz). At this time, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or a beam management procedure. After the serving beams 112, 113, 121, and 131 are selected, subsequent communication may be performed through a resource in a quasi co-located (QCL) relationship with a resource for transmission of the serving beams 112, 113, 121, and 131.

Figure 2:
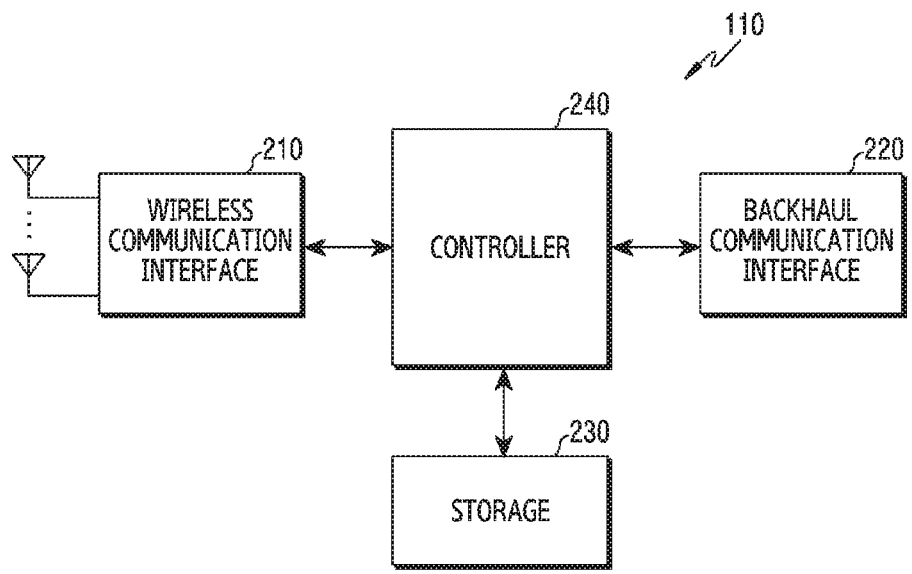
FIG. 2 illustrates a configuration of a base station (BS) in a wireless communication system according to various embodiments of the present disclosure.

FIG. 2 illustrates an example configuration of a base station in a wireless communication system according to an exemplary embodiment of the present disclosure. FIG. 2 illustrates an example of a configuration of the base station 110. Hereinafter, the term "unit" or the term ending with the suffix "-er" or "-or" refer to a unit for processing at least one function or operation and these terms may be implemented by using hardware or software or a combination of hardware and software.

Referring to FIG. 2, the base station includes a wireless communication interface 210, a backhaul communication interface 220, a storage 230, and a controller 240.

The wireless communication interface 210 performs functions for transmitting and receiving signals via a radio channel. For example, the wireless communication interface 210 performs a function of converting between a baseband signal and a bit string according to a physical layer standard of a system. For example, when transmitting data, the wireless communication interface 210 generates complex symbols by encoding and modulating a transmission bit string. In addition, when receiving data, the wireless communication interface 210 restores a reception bit string by demodulating and decoding a baseband signal. In addition, the wireless communication interface 210 up-converts a baseband signal into a radio frequency (RF) band signal and then transmits the RF band signal through an antenna, and down-converts an RF band signal received through the antenna into a baseband signal.

For example, the wireless communication interface 210 may include a transmission filter, a reception filter, an amplifier, a mixer, an oscillator, a digital to analog converter (DAC), an analog-to-digital converter (ADC), or the like. In addition, the wireless communication interface 210 may include at least one antenna array configured by a plurality of antenna elements. In view of hardware, the wireless communication interface 210 may be configured by a digital unit and an analog unit, and the analog unit may be configured by a plurality of sub-units according to operation power and operation frequency.

The wireless communication interface 210 transmits and receives signals as described above. Accordingly, the wireless communication interface 210 may be referred to as a transmission interface, a reception interface, a transmission and reception interface, a transmitter, a receiver or a transceiver. In addition, in the following description, transmitting and receiving performed through a radio channel may include processing by the wireless communication interface 210 as described above.

The backhaul communication interface 220 provides an interface for communication with other nodes in a network. That is, the backhaul communication interface 220 converts a bit string to be transmitted from the base station to another node, for example, another access node, another base station, a core network, or the like into a physical signal, and converts a physical signal received from another node into a bit string.

The storage 230 stores data such as a basic program, an application program, setting information, or the like for the operation of the base station 110. The storage 230 may be configured by a volatile memory, a nonvolatile memory, or a combination of a volatile memory and a nonvolatile memory. The storage 230 provides the stored data according to a request of the storage 230 and the controller 240.

The controller 240 controls overall operations of the base station 110. For example, the controller 240 transmits and receives signals through the wireless communication interface 210 or the backhaul communication interface 220. In addition, the controller 240 records and reads data on and from the storage 230. The controller 240 may perform functions of a protocol stack which a communication standard requires. To achieve this, the controller 240 may include at least one processor. According to an exemplary embodiment of the present disclosure, the controller 240 may include informing module 401, resource configuring module 403 and interference suppressing module 405. Here, informing module 401, resource configuring module 403 and interference suppressing module 405 may be a command/code resided in the controller 240, storage space that stores the command/code, or a part of circuitry configuring the controller 240.

According to exemplary embodiments of the present disclosure, the controller 240 may determine configuration of multiple access resources and allocate user resource. Moreover, the controller 240 may perform a joint detection and decoding on target user and interfering user. Thus, the controller 240 may suppress the inter-cell interferences in the wireless communication system.

Figure 3:
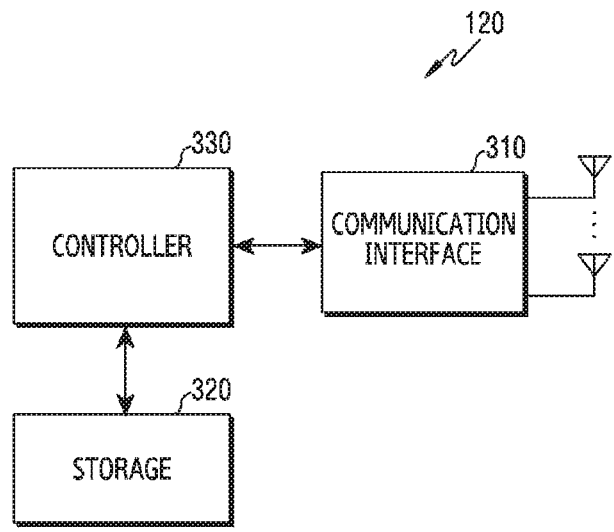
FIG. 3 illustrates a configuration of a terminal in a wireless communication system according to various embodiments of the present disclosure.

FIG. 3 illustrates an example configuration of a terminal in a wireless communication system according to an exemplary embodiment of the disclosure. FIG. 3 illustrates an example of a configuration of the terminal 120, 121, or 122. Hereinafter, the term "unit" or the term ending with the suffix "-er" or "-or" refer to a unit for processing at least one function or operation and these terms may be implemented by using hardware or software or a combination of hardware and software.

Referring to FIG. 3, the terminal includes a communication interface 310, a storage 320, and a controller 330.

The communication interface 310 performs functions for transmitting and receiving signals via a radio channel. For example, the communication interface 310 performs a function of converting between a baseband signal and a bit string according to a physical layer standard of a system. For example, when transmitting data, the communication interface 310 generates complex symbols by encoding and modulating a transmission bit string. In addition, when receiving data, the communication interface 310 restores a reception bit string by demodulating and decoding a baseband signal. In addition, the communication interface 310 up-converts a baseband signal into an RF band signal and then transmit the RF band signal through an antenna, and down-converts an RF band signal received through the antenna into a baseband signal. For example, the communication interface 310 may include a transmission filter, a reception filter, an amplifier, a mixer, an oscillator, a DAC, an ADC, or the like.

The communication interface 310 may include a plurality of transmission/reception paths. The communication interface 310 may include at least one antenna array configured by a plurality of antenna elements. In view of hardware, the communication interface 310 may be configured by a digital circuitry and an analog circuitry (e.g., radio frequency integrated circuit (RFIC)). Here, the digital circuitry and analog circuitry may be implemented as one package. Also, the communication interface 310 may include a plurality of RF chain. The communication interface 310 may perform beamforming.

Also, the communication interface 310 may include different communication modules for processing signals of different frequency band. The communication interface 310 may include a plurality of communication modules for supporting a plurality of different wireless access technologies. For example, the plurality of different wireless access technologies may include Bluetooth low energy (BLE), WI-FI®, Wi-Fi gigabyte (WiGig), cellular network (e.g., long term evolution (LTE)), or the like. Also, different frequency bands may include super high frequency (SHF) (e.g., 2.5 GHz, 5 GHz) band and millimeter wave (e.g., 60 GHz).

The communication interface 310 transmits and receives signals as described above. Accordingly, the communication interface 310 may be referred to as a transmission interface, a reception interface, a transmission and reception interface, a transmitter, a receiver or a transceiver. In addition, in the following description, transmitting and receiving performed through a radio channel may include processing by the communication interface 310 as described above.

The storage 320 stores data such as a basic program for the operation of the terminal, an application program, setting information, or the like. The storage 320 may be configured by a volatile memory, a nonvolatile memory, or a combination of a volatile memory and a nonvolatile memory. In addition, the storage 320 provides stored data in response to a request of the controller 330.

The controller 330 controls overall operations of the terminal. For example, the controller 330 transmits and receives signals through the communication interface 310. In addition, the controller 330 records and reads data on and from the storage 320. The controller 330 may perform functions of a protocol stack which the communication standard requires. To achieve this, the controller 330 may include at least one processor or microprocessor or may be a part of the processor. In addition, a part of the communication interface 310 and the controller 330 may be referred to as a communication processor (CP).

According to exemplary embodiments of the present disclosure, the controller 330 may select received resources and process data. For example, the controller 330 may control the terminal to perform operations according to the exemplary embodiments of the present disclosure.

The present disclosure provides a method for suppressing an inter-cell interference. When applying NOMA in the whole cellular network, no matter a user selects resources freely in a grant-free scene, or a network side allocates resources in a grant-based scene, BSs may configure an available multiple access resource set within each cell. First of all, the BSs may configure different multiple access resource sets for different cells initially, so as to avoid interferences of the same multiple access resource. Subsequently, after exchanging information among cells, a BS in a target cell may learn information of multiple access resource sets used by adjacent cells, modulation encoding mode of an interfering user, and so on. Thus, when performing the decoding, the BS comprehensively considers the obtained information of interfering users, decodes interference signals, so as to suppress or cancel interferences.

The present disclosure also provides a method for configuring multiple access resources, so as to suppress an inter-cell interference. In a cellular system applying the NOMA, BSs may configure a corresponding multiple access resource set for each cell. Users within a cell may select a multiple access resource freely in a grant-free mode. Alternatively, multiple access resources may be allocated with a grant-based mode. Some multiple access schemes only have one identity (ID) for differentiating users, such as sparse codebook of SCMA, codebook matrix sequence of PDMA, complex spreading sequence of MUSA, and so on. However, some multiple access schemes have various IDs for differentiating users, e.g., DMRS in SCMA adopted by a user may be set as an ID for differentiating users, and then the SCMA has two IDs for differentiating users.

Figure 4:
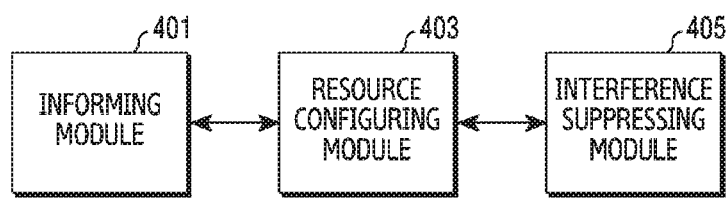
FIG. 4 illustrates a block diagram of an apparatus for suppressing an inter-cell interference in a wireless communication system according to various embodiments of the present disclosure.

FIG. 4 illustrates a block diagram of an apparatus for suppressing an inter-cell interference in a wireless communication system according to various embodiments of the present disclosure.

Referring to FIG. 4, the controller 240 may include informing module 401, resource configuring module 403, interference suppressing module 405. The resource configuring module 403 may configure a different multiple access resource set with an interfering BS. The informing module 401 may inform a user within a cell about information of configured multiple access resources, which are adopted by the user within the cell to transmit signals. The interference suppressing module 405 may detect and decode a received signal, and obtain data of a target user after suppressing interferences FIG. 5 illustrates a schematic diagram for representing an inter-cell interference of uplink transmission in a wireless communication system according to various embodiments of the present disclosure.

Figure 5:
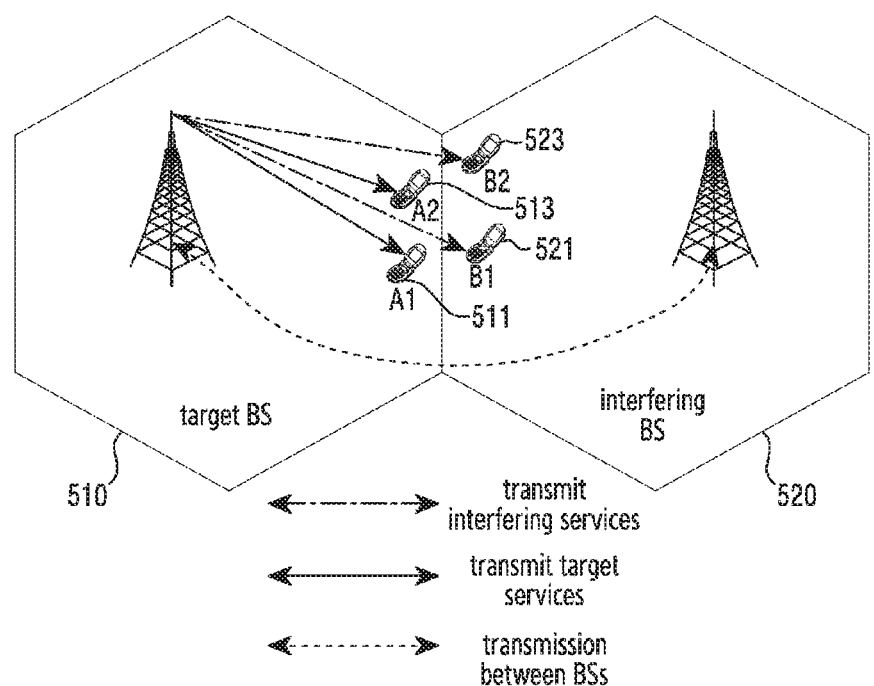
FIG. 5 illustrates a schematic diagram for representing an inter-cell interference of uplink transmission in a wireless communication system according to various embodiments of the present disclosure.

Referring to FIG. 5, a multiple access scheme used by a network system is denoted to "MA (multiple access)". The BSs may respectively denote N IDs for differentiating users in the multiple access scheme with $MA_1$, $MA_2$, ..., $MA_N$. There are $T_n$ ($0<n\leq N$) selections for each ID, such as: a first ID $MA_1=\{MA_{1-1}, MA_{1-2}, \ldots, MA_{1-T1}\}$, a second ID $MA_2=\{MA_{2-1}, MA_{2-2}, \ldots, MA_{2-T2}\}$, and so on. And then, for two adjacent cells, as shown in FIG. 5, the BSs may respectively configure a multiple access resource set for these two cells. Firstly take into account a scene, where one BS is a target BS 510 (which may also be referred to as a service BS, includes a target user or a served user), while the other BS is an interfering BS 520 of the target BS 510. The target BS 510 and the interfering BS 520 adopt the same multiple access scheme, which is the MA. A1 511 and A2 513 represent terminals served by the target BS 510. B1 521 and B2 523 represent terminals served by the interfering BS 520. The B1 521 and the B2 523 may transmit interfering services to the target BS 510 when they transmit uplink. The A1 511 and the A2 513 may transmit target services to the target BS 510 when they transmit uplink. When communication is performed using the backhaul communication unit between the target BS 510 and the interfering BS 520, interference with the counterpart BS may occur.

Figure 6:
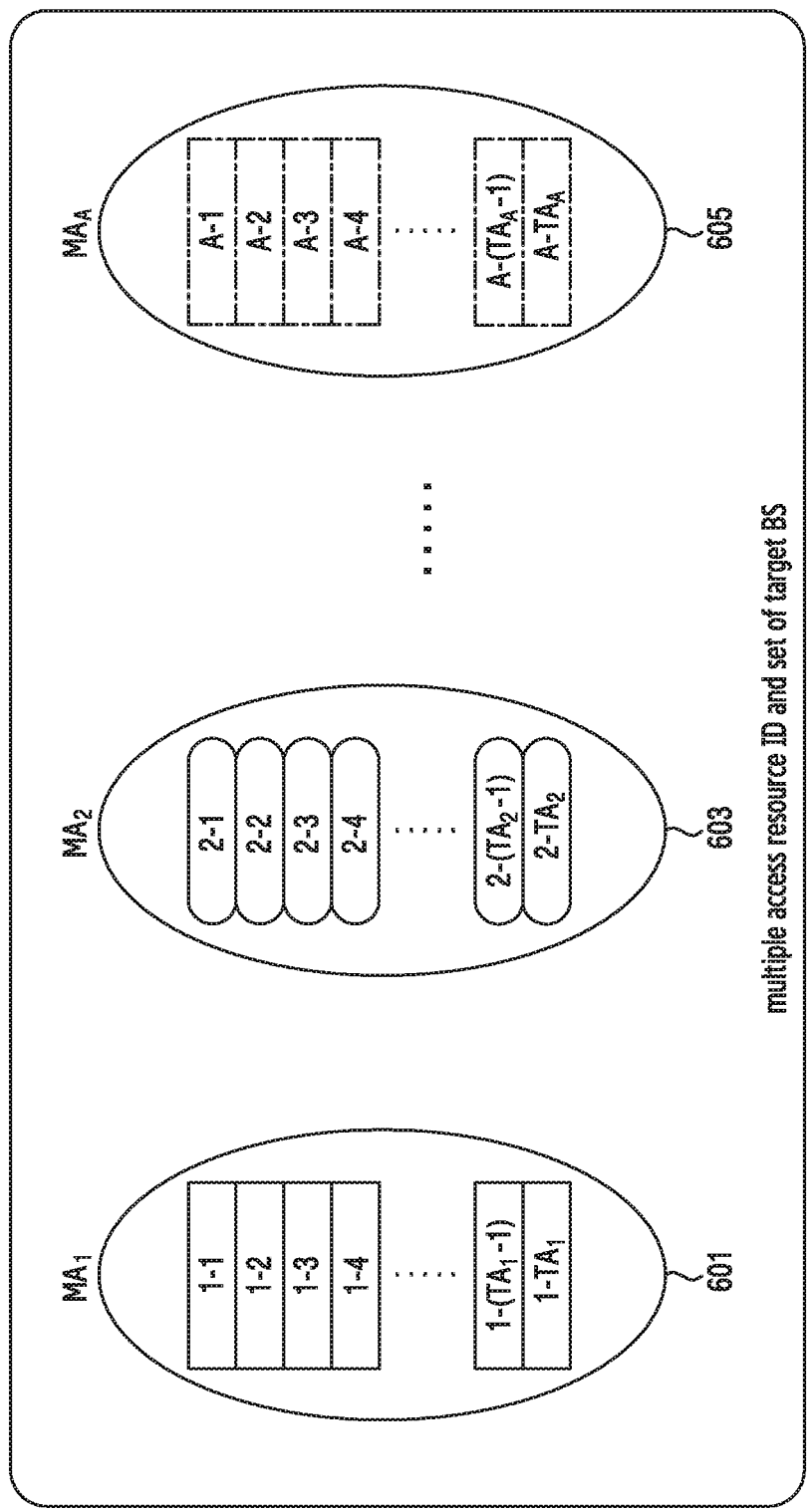
FIG. 6 illustrates a schematic diagram for representing multiple access resource ID and set of a target BS in a wireless communication system according to various embodiments of the present disclosure.

FIG. 6 illustrates a schematic diagram for representing multiple access resource ID and set of a target BS in a wireless communication system according to various embodiments of the present disclosure Referring to FIG. 6, the multiple access resource set of the target BS is $\{MA_1, MA_2, \ldots, MA_A\}$. That is, there are A multiple access resource IDs. As shown in FIG. 6, the $a^{th}$ multiple access resource ID set includes $TA_a$ ($0<a\leq A$) possible multiple access resources, for example, the first multiple access resource ID set $MA_1=\{MA_{1-1}, MA_{1-2}, \ldots, MA_{1-TA1}\}$, the second multiple access resource ID set $MA_2=\{MA_{2-1}, MA_{2-2}, \ldots, MA_{A-TA2}\}$, ..., the $A^{th}$ multiple access resource ID set $MA_A=\{MA_{A-1}, MA_{A-2}, \ldots, MA_{A-TA_A}\}$ The multiple access resource set of the interfering BS is $\{MA_1, MA_2, \ldots, MA_B\}$. That is, there are B multiple access resource IDs. Similar with the target BS, the $b^{th}$ multiple access resource ID set of the interfering BS includes $TB_b$ ($0<b\leq B$) possible multiple access resources, such as the first multiple access resource ID set $MA_1=\{MA_{1-1}, MA_{1-2}, \ldots, MA_{1-TB1}\}$, the second multiple access resource ID set $MA_2=\{MA_{2-1}, MA_{2-2}, \ldots, MA_{2-TB2}\}$, the $B^{th}$ multiple access resource ID set $MA_B=\{MA_{B-1}, MA_{B-2}, \ldots, MA_{1-TB_B}\}$.

In an orthogonal access scheme of current Long Term Evolution (LTE) system, BSs differentiate various users based on different time-frequency resources, which are occupied by the various users. Thus, when a user of an interfering BS selects the same time-frequency resource with a user of a target BS to transmit data, interferences will be generated for the user of the target BS. However, the NOMA scheme supports different users to transmit data with the same time-frequency resources, and relies on other IDs to differentiate users. Thus, when a first multiple access resource set used by the interfering BS is overlapped (that is, including the same multiple access resource) with a second multiple access resource set, which is used by the target BS, a conflict interference may be generated for the target BS. However, the objective of the NOMA scheme is to improve number of users that can be served simultaneously, such that interference probability for adjacent cells may become greater, and interference may be more serious. In the present disclosure, after designing a configuration relationship for multiple access resources among adjacent cells, and exchanging information among BSs of adjacent cells, the effects for suppressing inter-cell interferences may be obtained, when adopting the NOMA scheme.

First of all, when the interfering BS adopts the same frequency band with the target BS to transmit data, interferences may be generated for users served by the target BS. In the method put forward by the present disclosure, after coordinating among BSs, two groups of BSs are configured with different multiple access resource sets (that is, the respectively included multiple access resource is different). Subsequently, the conflict problem of multiple access resources among adjacent cells may be avoided. Specifically, representation methods of multiple access resources between two adjacent cells are as described above. The target BS and the interfering BS use the same MA scheme. The two cells use the two same multiple access resource IDs $MA_1$ and $MA_2$, that is, A=B=2. After configuration, the following effects may be achieved.

1. The first multiple access resource ID sets of the target BS and the interfering BS are different ($MA_1$ of two BSs does not include the same multiple access resource). The second multiple access resource ID sets of the target BS and the interfering BS are the same (multiple access resources of $MA_2$ of two BSs are the same). That is, by adopting the first multiple access resource ID, adjacent cells may identify whether a user is within current cell. Furthermore, the BSs may differentiate users within the same cell, by using the first multiple access resource ID, or the second multiple access resource ID or a combination of the first and second multiple access resource IDs.

2. The first multiple access resource ID sets of the target BS and the interfering BS are the same (multiple access resources of $MA_1$ of two BSs are the same). The second multiple access resource ID sets of the target BS and the interfering BS are different (multiple access resources of $MA_2$ of two BSs are different). That is, adjacent cells identify whether a user is served by the cell, by adopting the second multiple access resource ID. Furthermore, the BSs may differentiate various users within the same cell, by using the first multiple access resource ID, or the second multiple access resource ID or a combination of the first and second multiple access resource IDs.

3. The combination sets of the first and second multiple access resource IDs of the target BS and the interfering BS are different (users within two BSs cannot possess the same $MA_1$ and $MA_2$ simultaneously). That is, adjacent cells identify whether a user is served by the cell, by using the combination of first and second multiple access resource IDs. Furthermore, the BSs may differentiate users within the same cell by using the first multiple access resource ID, or the second multiple access resource ID, or a combination of the first and second multiple access resource IDs.

After configuring with foregoing three methods, for multiple access resources adopted by users among adjacent cells, conflict problem will not occur. Although foregoing configuration scheme is applied in a case, where two kinds of multiple access resource IDs are used, it is easily extended for a similar configuration scheme to other cases, e.g., for a multiple access scheme adopted by adjacent cells, there are N (N>2) multiple access resource IDs, the target BS and the interfering BS may be configured with different $n^{th}$ (0<n≤N) multiple access resource ID sets, so as to identify whether a user is served by the cell (that is, differentiate a cell to which the user belongs), or be configured with m (1<m≤N) different combination sets of multiple access resource IDs, so as to identify whether a user is served by the cell. More particularly, when the multiple access scheme has one multiple access resource ID, the target BS and interfering BS may be configured with different sets of multiple access resource IDs, so as to identify whether a user is served by the cell.

Since the NOMA scheme aims to enable multiple users to be served with the same block of time-frequency resource, even if there is no conflict of multiple access resources among users, some interference may be generated for users of adjacent cells, due to the fact that data is transmitted with the same block of time-frequency resource. Thus, the present disclosure puts forward the following contents. When the interfering BS and the target BS use the same time-frequency resources to serve users, the interfering BS needs to transmit an interference indicator to the target BS, and informs the target BS about information, such as number of users generating interference, used multiple access resources, DMRS resource, Modulation and Coding Scheme (MCS) setting. After receiving foregoing information, the target BS may learn in advance that, signal interferences may be generated by interfering users for the time-frequency resource, which is used by transmission of target user. Thus, after receiving signals from the target user subsequently, the target BS may simultaneously detect and decode signals of the target user and interfering user, by utilizing obtained resource configuration of the interfering user, such as, the used multiple access resources, the allocated DMRS, and ultimately cancel the interferences coming from the interfering user, so as to obtain correct data of the target user.

Figure 7:
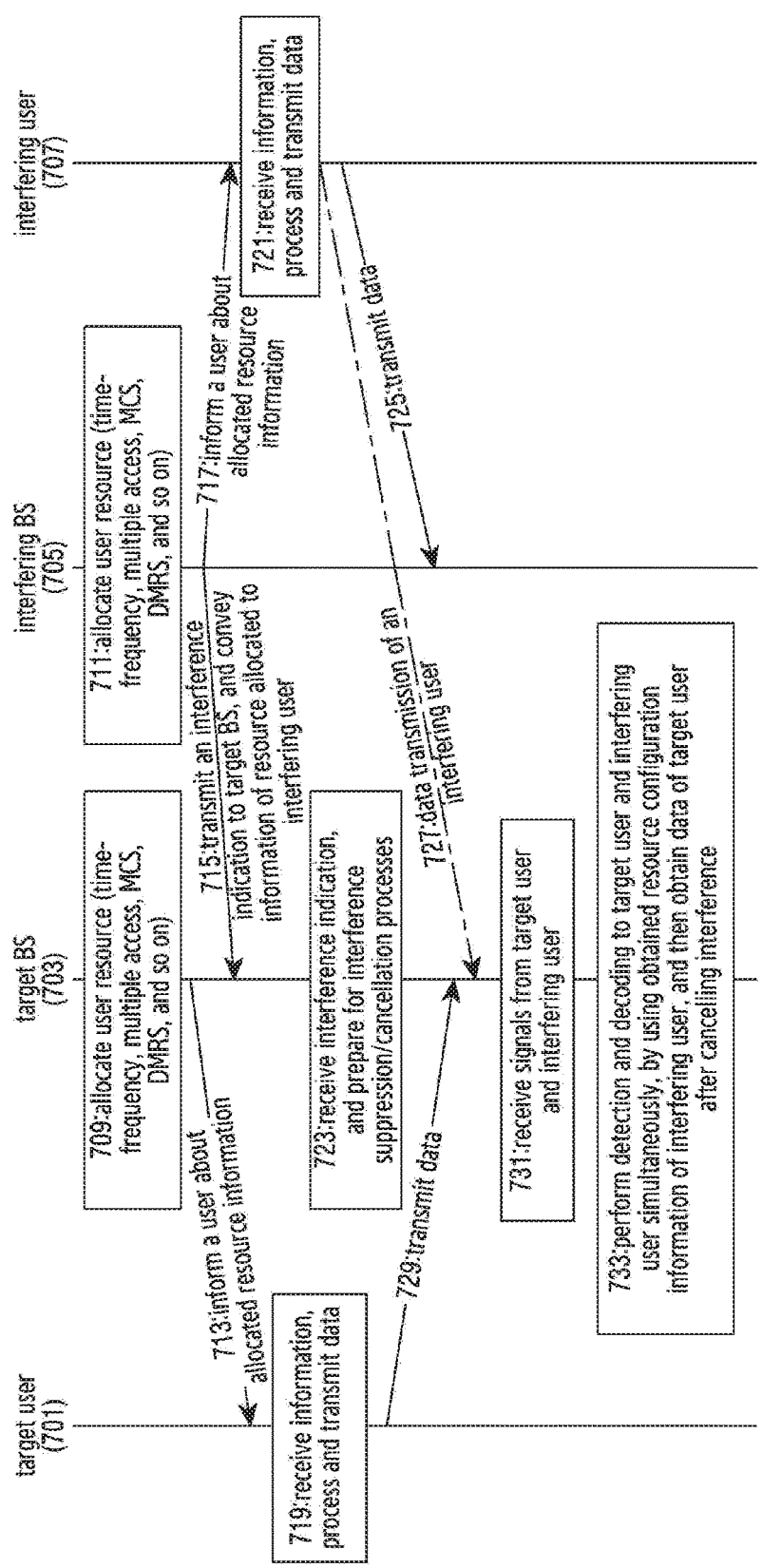
FIG. 7 illustrates a flowchart for representing how to suppress/cancel inter-cell interferences in a wireless communication system according to various embodiments of the present disclosure.

FIG. 7 illustrates a flowchart for representing how to suppress/cancel inter-cell interferences in a wireless communication system according to various embodiments of the present disclosure. FIG. 7 shows a method of operation of a target user 701, a target BS 703, an interfering BS 705, and an interfering user 707.

Referring to FIG. 7, in step 709, the target BS allocates resources (time-frequency resources, multiple access resources, MCS, DMRS, and so on) to users within a cell.

In step 711, the interfering BS allocates resources (time-frequency resources, multiple access resources, MCS, DMRS, and so on) to users within a cell. According to various embodiments of the present disclosure, steps 709 and 711 may be performed simultaneously or sequentially.

In step 713, the target BS informs a user about allocated resource information.

In step 715, the interfering BS transmits an interference indication to target BS, and convey information of resource allocated to interfering user. That is, when the interfering BS has generated interferences for the target BS based on configurations, the interfering BS needs to transmit an interference indication to the target BS. When it is not possible to generate interference by the interfering BS, it is not necessary for the interfering BS to transmit the interference indication. Meanwhile, the interfering BS may transmit resource information (multiple access resources, MCS, DMRS, and so on) of a possible interfering user to the target BS.

In step 717, the interfering BS informs a user about allocated resource information. According to various embodiments of the present disclosure, steps 713 and 717 may be performed simultaneously or sequentially.

In step 719, the target user receives information, processes and transmits data.

In step 721, the interfering receives information, processes and transmits data.

In step 723, the target BS receives interference indication and prepare for interference suppression and cancellation processes. That is, the target BS may receive the interference indication, and resource information of the possible interfering user. According to various embodiments of the present disclosure, steps 719 and 723 may be performed simultaneously or sequentially.

In step 725, the interfering user transmits data to the interfering BS.

In step 727, the interfering user transmits data of the interfering user to the target BS.

In step 729, the target user transmits data to the target BS. According to various embodiments of the present disclosure, steps 725 and 729 may be performed simultaneously or sequentially.

In step 731, the target BS receives signals from the target user and the interfering user. That is, the target BS may receive a combined signal of a target user and an interfering user.

In step 733, the target BS performs a joint detection and decoding to the combined signal of the target user and interfering user, by using the obtained resource configuration information of interfering user, and obtains data of the target user after cancelling interference.

Detailed descriptions of technical solutions in the present disclosure will be provided in the following, accompanying with specific parameter designs and several preferred embodiments.

Embodiment 1

In the embodiment, how to enforce the solution for suppressing/cancelling an inter-cell interference in the present disclosure will be described, by taking into account a specific MA scheme-Interleave-Grid Multiple Access (IGMA).

Figure 8:
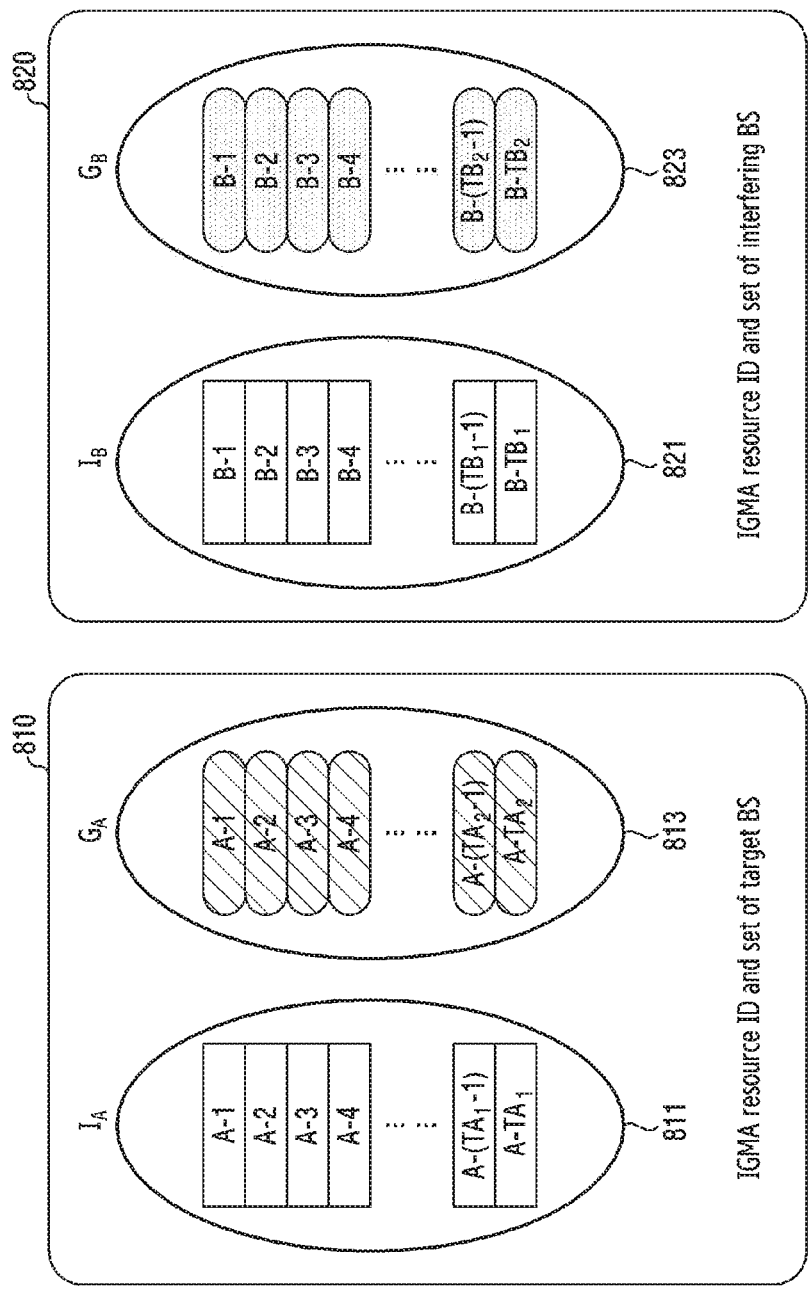
FIG. 8 illustrates an example of configurations of multiple access resources among cells with different grid-mapping patterns in a wireless communication system according to first embodiment of the present disclosure.

FIG. 8 illustrates an example of configurations of multiple access resources among cells with different grid-mapping patterns in a wireless communication system according to first embodiment of the present disclosure. The FIG. 8 includes IGMA resource ID and set of target BS 810 and IGMA resource ID and set of interfering BS.

The IGMA has two IDs for differentiating users. The first ID is a bit-level interleave pattern (denoted with I). The second ID is a grid-mapping pattern (denoted with G). When two adjacent cells adopt the IGMA scheme, and serve users with the same block of time-frequency resources, it is possible to cause conflict of multiple access resources among users, and an inter-cell interference.

Denote a bit-level interleave pattern set of a target BS with $I_A=\{I_{A-1}, I_{A-2}, \ldots, I_{A-TA_1}\}$. That is, there are $TA_1$ available bit-level interleave patterns in total. Denote a grid-mapping pattern set of the target BS with $G_A=\{G_{A-1}, G_{A-2}, \ldots, G_{A-TA_2}\}$ That is, there are $TA_2$ available grid mapping patterns in total.

Similarly, denote a bit-level interleave pattern set of an interfering BS with $I_B=\{I_{B-1}, I_{B-2}, \ldots, I_{B-TB_1}\}$. That is, there are $TB_1$ available bit-level interleave patterns in total. Denote a grid-mapping pattern set of the interfering BS with $G_B=\{G_{B-1}, G_{B-2}, \ldots, G_{B-TB_2}\}$. That is, there are $TB_2$ available grid-mapping patterns in total.

When not performing an individualized configuration, $I_A$ and $I_B$ are possible to include the same bit-level interleave pattern. Similarly, $G_A$ and $G_B$ are possible to include the same grid-mapping pattern. And then, for users in different cells, multiple access resource collision may occur, thereby causing failed decoding.

In the embodiment, after exchanging information between the target BS and the interfering BS, the target BS and interfering BS are configured with the same bit-level interleave pattern set, and different grid-mapping pattern sets. As shown in FIG. 8, $I_A=I_B$, and $G_A \neq G_B$.

In a grant-based case, the target BS and interfering BS may allocate different bit-level interleave patterns, and/or, grid-mapping patterns for users in respective cell, based on respectively configured resource set, and inform users with downlink channels. And then, users may process and transmit data, by using the allocated bit-level interleave patterns and grid-mapping patterns. However, the BS may identify users in the cell served by the BS, by using grid-mapping patterns in the multiple access resource set. At this time, the following methods are used to differentiate users within one cell.

1. Differentiate users within one cell, by using the bit-level interleave pattern. And then, users within the same cell may be allocated with the same grid-mapping pattern, and different bit-level interleave patterns. More particularly, there may be only one grid-mapping pattern in $G_A$ and $G_B$.
2. Differentiate users within one cell, by using the grid-mapping pattern. And then, users within the same cell need to be allocated with different grid-mapping patterns, accompanying with no requirement for bit-level interleave pattern. More particularly, users may not adopt the bit-level interleave pattern.
3. Differentiate users within one cell, by using a combination of bit-level interleave pattern and grid-mapping pattern. And then, bit-level interleave patterns and grid-mapping patterns allocated for users within one cell are not the same simultaneously. A particular rule is as follows. After processing the same data sequence with different combinations of bit-level interleave sequence and grid-mapping pattern, different data sequences are obtained.

Figure 9:
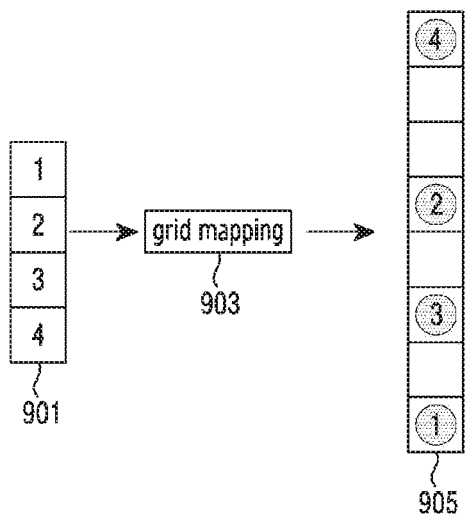
FIG. 9 illustrates an example of grid-mapping in a wireless communication system according to first embodiment of the present disclosure.

FIG. 9 illustrates an example of grid-mapping in a wireless communication system according to first embodiment of the present disclosure.

Referring to FIG. 9, for a method, which differentiates users coming from various cells by configuring different grid-mapping patterns for different cells, there is a particular rule to reduce the inter-cell interference. By performing grid-mapping process, a data symbol sequence of a user may be sparsely mapped to a time-frequency Resource Element (RE). As shown in FIG. 9, sequence of data symbols 901 may be changed. The spread spectrum processing may be performed to data symbols. Here, only use a result obtained after performing the grid-mapping process 903 to a data symbol sequence, which is not related with specific grid-mapping operations. For example, data symbols 901 may be mapped 905 to an RE through the grid-mapping process 903.

Figure 10:
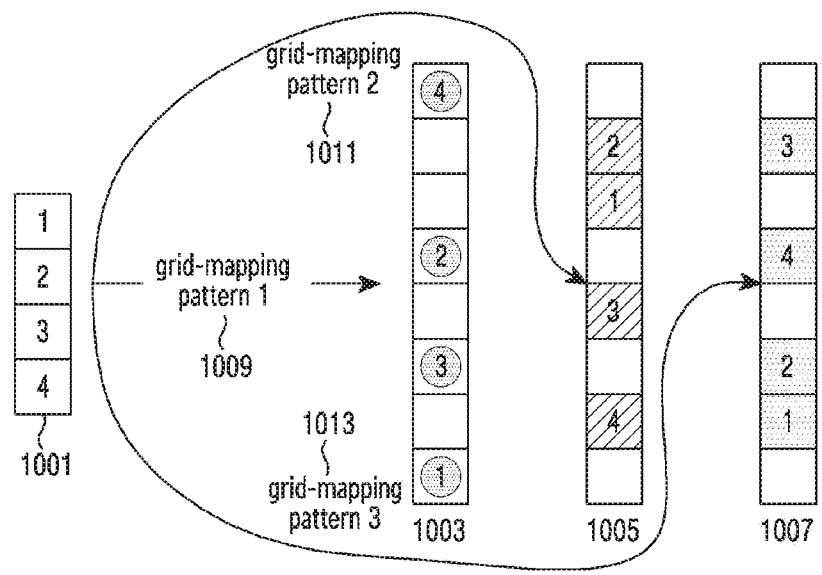
FIG. 10 illustrates an example of orthogonal grid-mapping patterns and semi-orthogonal grid-mapping patterns, in a wireless communication system according to first embodiment of the present disclosure.

FIG. 10 illustrates an example of orthogonal grid-mapping patterns and semi-orthogonal grid-mapping patterns, in a wireless communication system according to first embodiment of the present disclosure.

Referring to FIG. 10, After the same data symbol sequence 1001 passing different grid-mapping patterns, different data symbols may be mapped to totally different REs, or the totally same RE (at this time, sequence of data symbol sequences is different), or some data symbols are mapped to the same RE. As shown in FIG. 10, data symbol sequence A 1003 is obtained after passing grid-mapping pattern 1 1009. Data symbol sequence B 1005 is obtained after passing grid-mapping pattern 2 1011. The data symbol sequences A 1003 and B 1005 are not overlapped at all, that is, there is no conflict. In the present disclosure, grid-mapping patterns of such type are referred to as orthogonal grid-mapping patterns. For example, the grid-mapping pattern 1 1009 and the grid-mapping pattern 2 1011 are referred to as orthogonal grid-mapping patterns. Data symbol sequence C 1007 is obtained after passing grid-mapping pattern 3 1013. The data symbol sequence C 1007 is respectively partially-overlapped with data symbol sequences A 1003 and B 1005. In the present disclosure, the grid-mapping pattern 1 1009 and grid-mapping pattern 3 1013 are referred to as semi-orthogonal grid-mapping patterns. The grid-mapping pattern 2 1011 and grid-mapping pattern 1013 are also referred to as semi-orthogonal grid-mapping patterns. After the same data symbol sequence passing different grid-mapping patterns, when the obtained data symbol sequences are mapped to the totally same RE (however, sequence of data symbol sequences is different), such grid-mapping patterns in the present disclosure are referred to as non-orthogonal grid-mapping patterns.

Figure 11:
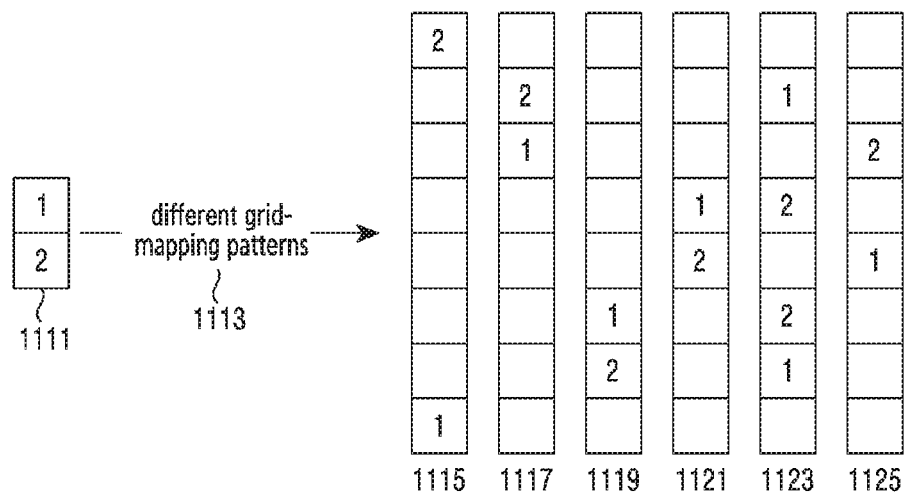
FIG. 11 illustrates an example of multiple mutual orthogonal grid-mapping patterns, in a wireless communication system according to first embodiment of the present disclosure.

FIG. 11 illustrates an example of multiple mutual orthogonal grid-mapping patterns, in a wireless communication system according to first embodiment of the present disclosure Referring to FIG. 11, it should be noted that, there may be more than 2 orthogonal grid-mapping patterns. When density of a grid-mapping pattern is lower, there are more mutual orthogonal grid-mapping patterns. As shown in FIG. 11, after the same group of data sequences passing different grid-mapping patterns, mutual orthogonal mapped data sequences may be generated, such as A 1115, B 1117, C 1119 and D 1121. However, after the foregoing same group of data sequences 1111 passing other groups of different grid-mapping patterns 1113, different mutual orthogonal mapped data sequences may be generated. As shown in FIG. 11, A 1115, E 1123, F 1125 are also mutual orthogonal mapped data sequences. Thus, it can be seen that, grid-mapping patterns with different densities may be mutual orthogonal.

Thus, to better deal with the inter-cell interference, a special configuration scheme may be adopted, so as to allocate mutual orthogonal grid-mapping patterns for adjacent cells. However, non-orthogonal grid-mapping patterns may be configured within one cell. Thus, for signals of the target BS, it may be guaranteed that there is almost no interference coming from signals of the interfering BS. Specifically, the configuration rule of adjacent cells is as follows.

1. Preferably configure mutual orthogonal grid-mapping patterns for adjacent cells.

2. When there is no orthogonal grid-mapping pattern, preferably configure semi-orthogonal grid-mapping patterns for adjacent cells.
3. When there is no orthogonal or semi-orthogonal grid-mapping pattern, configure non-orthogonal grid-mapping patterns for adjacent cells.

The configuration scheme of foregoing grid-mapping pattern may also be applied to a grant-free (competition-based) transmission mode. Similar to a grant-based transmission, after exchanging information among BSs, determine an available set of bit-level interleave pattern and grid-mapping pattern resource within a cell, which is configured by the BS. Specific methods may be as follows:
1. When the grant-free scheme is to freely select resources by a user, a BS may inform the user about information of an available set of bit-level interleave pattern and grid-mapping pattern, by using a downlink channel (including: a physical broadcast channel, a physical downlink control channel (PDCCH), a physical downlink shared channel (PDSCH), and so on). And then, the user selects the adopted bit-level interleave pattern and grid-mapping pattern from the resource set.
2. When the grant-free scheme is to allocate multiple access resources for a user by a BS, similar to the grant-based scheme, the BS informs the user about the bit-level interleave pattern and grid-mapping pattern allocated for the user, by using a downlink channel. However, different from the grant-based scheme, at this time, different users may be allocated with the same bit-level interleave pattern and/or grid-mapping pattern.

Embodiment 2

In the embodiment, how to enforce the solution for suppressing/cancelling an inter-cell interference in the present disclosure will be described, by continuously taking into account a specific MA scheme-IGMA.

Figure 12:
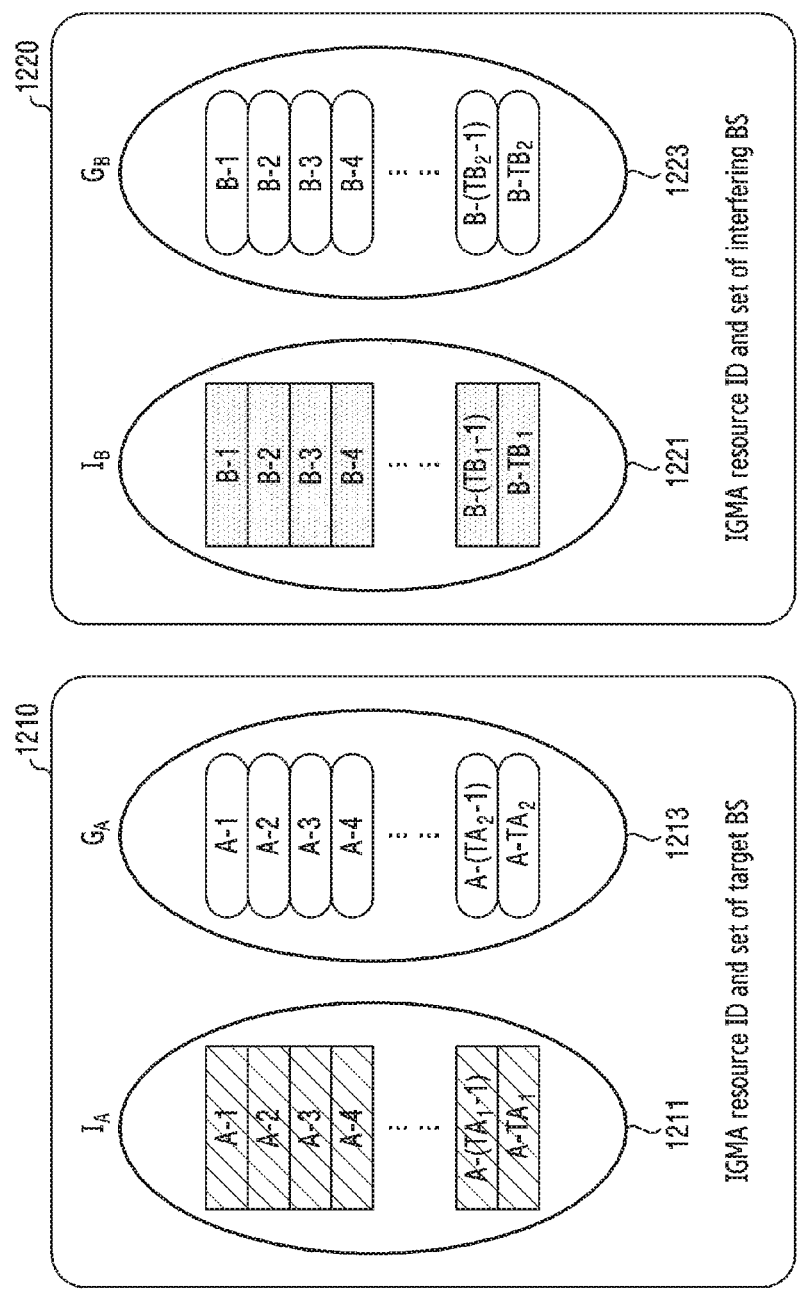
FIG. 12 illustrates an example of configurations of multiple access resources among cells with different bit-level interleave patterns in a wireless communication system according to second embodiment of the present disclosure.

FIG. 12 illustrates an example of configurations of multiple access resources among cells with different bit-level interleave patterns in a wireless communication system according to second embodiment of the present disclosure. The FIG. 12 includes IGMA resource ID and set of target BS 1210 and IGMA resource ID and set of interfering BS 1220.

The IGMA has two IDs for differentiating users. The first ID is a bit-level interleave pattern (denoted with I). The second ID is a grid-mapping pattern (denoted with G). When two adjacent cells adopt the IGMA, and serve users with the same block of time-frequency resource, it may cause conflict of multiple access resources among users, and problems of inter-cell interference.

A bit-level interleave pattern set of a target BS may be denoted with $I_A = \{I_{A-1}, I_{A-2}, \ldots, I_{A-TA_1}\}$. That is, there are $TA_1$ available bit-level interleave patterns in total. A grid-mapping pattern set of the target BS may be denoted with $G_A = \{G_{A-1}, G_{A-2}, \ldots, G_{A-TA_2}\}$. That is, there are $TA_2$ available grid mapping patterns in total.

Similarly, a bit-level interleave pattern set of an interfering BS may be denoted with $I_B = \{I_{B-1}, I_{B-2}, \ldots, I_{B-TB_1}\}$. That is, there are $TB_1$ available bit-level interleave patterns in total. A grid-mapping pattern set of the interfering BS may be denoted with $G_B = \{G_{B-1}, G_{B-2}, \ldots, G_{B-TB_2}\}$. That is, there are $TB_2$ available grid-mapping patterns in total.

When not performing an individualized configuration, $I_A$ and $I_B$ may include the same bit-level interleave pattern. Similarly, $G_A$ and $G_B$ may also include the same grid-mapping pattern. And then, for users in different cells, collision of multiple access resources may occur, thereby causing failed decoding.

In the embodiment, after exchanging information between the target BS and the interfering BS, the target BS and interfering BS may be configured with different bit-level interleave pattern sets and the same grid-mapping pattern set. As shown in FIG. 12, $I_A \neq I_B$ and $G_A = G_B$.

In a grant-based case, the target BS and interfering BS allocate different bit-level interleave patterns and/or grid-mapping patterns for a user of respective cell, based on respectively configured resource set, and inform the user by using a downlink channel. And then, the user processes and transmits data, by using the allocated bit-level interleave pattern and grid-mapping pattern. However, the BS identifies users in the cell served by the BS, by using the bit-level interleave patterns in the multiple access resource set. At this time, the following methods are used to differentiate users within the cell:
1. Differentiate users within the cell by using a bit-level interleave pattern. And then, users within the same cell must be allocated with different bit-level interleave patterns. The bit-level interleave patterns of various cells are different. No requirement has been put forward for the grid-mapping pattern.
2. Differentiate users within the cell by using a grid-mapping pattern. And then, users within the same cell are allocated with different grid-mapping patterns. No requirement has been put forward for the bit-level interleave pattern. The bit-level interleave patterns of various cells are different. No requirement has been put forward for the grid-mapping pattern. More particularly, users within the same cell may be allocated with the same bit-level interleave pattern.
3. Differentiate users within the cell, by using a combination of bit-level interleave pattern and grid-mapping pattern. And then, the bit-level interleave patterns and grid-mapping patterns allocated for users within the same cell are not the same simultaneously. A special rule is as follows. After processing the same data sequence with different combinations of bit-level interleave sequence and grid-mapping pattern, the obtained data sequences are different.

The configuration scheme of foregoing grid-mapping pattern may also be applied to a grant-free (competition-based) transmission mode. Similar to the grant-based transmission, firstly exchanging information among BSs, determine an available resource set of bit-level interleave pattern and grid-mapping pattern within the cell, which is configured by the BS. The specific methods may be as follows:
1. When the grant-free scheme is to freely select a resource by a user, a BS may inform a user about information of an available resource set, which includes the bit-level interleave pattern and grid-mapping pattern, by using a downlink channel (including: a physical broadcast channel, a PDCCH, a PDSCH, and so on). And then, the user selects the adopted bit-level interleave pattern and grid-mapping pattern from the resource set.
2. When the grant-free scheme is to allocate multiple access resources for a user by a BS, similar to the grant-based scheme, a BS informs a user about the bit-level interleave pattern and grid-mapping pattern allocated for the user, by using a downlink channel. However, different from the grant-based scheme, at this time, different users may be allocated with the same bit-level interleave pattern and/or grid-mapping pattern.

Embodiment 3

In the embodiment, how to enforce the solution for suppressing/cancelling an inter-cell interference in the present disclosure will be described, by continuously taking into account a specific MA scheme-IGMA.

Figure 13:
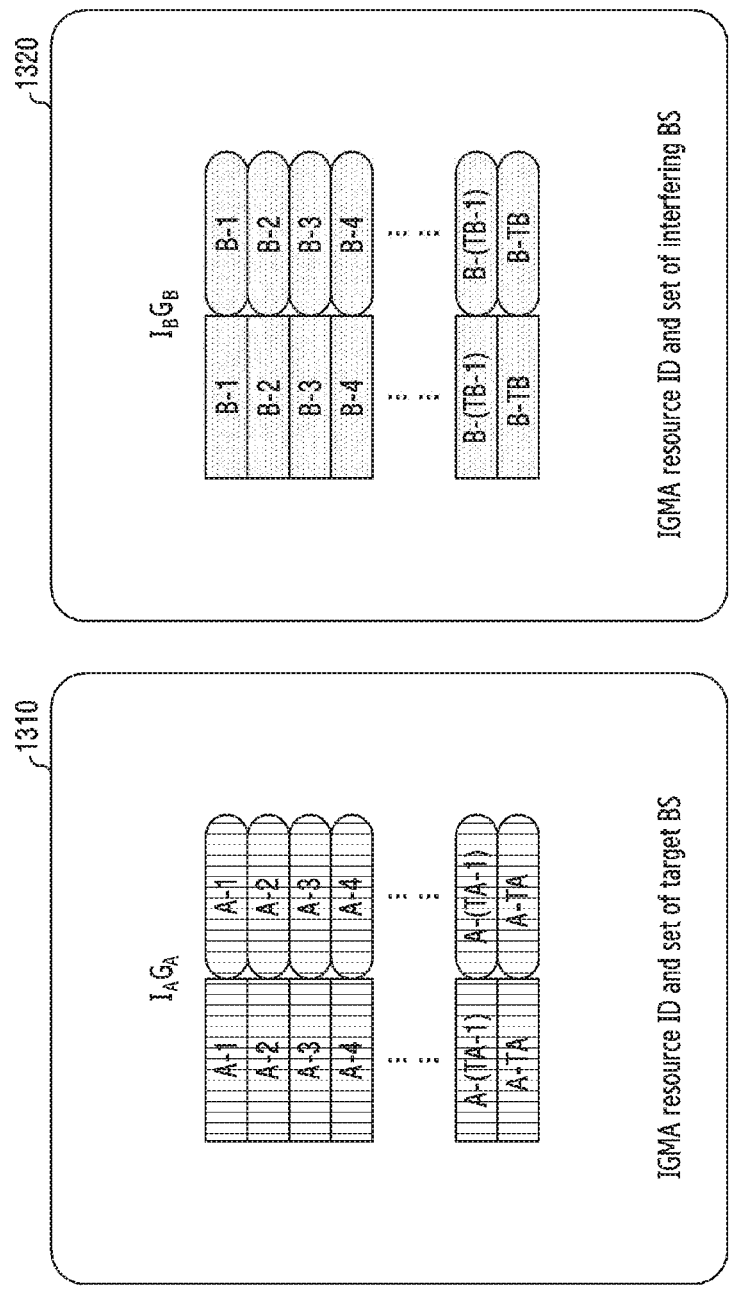
FIG. 13 illustrates an example of configurations of multiple access resources among cells, in which the cells possess different combinations of bit-level interleave pattern and grid-mapping pattern, in a wireless communication system according to third embodiment of the present disclosure.

FIG. 13 illustrates an example of configurations of multiple access resources among cells, in which the cells possess different combinations of bit-level interleave pattern and grid-mapping pattern, in a wireless communication system according to third embodiment of the present disclosure. The FIG. 13 includes IGMA resource ID and set of the target BS 1310 and IGMA resource ID and set of the interfering BS 1320.

The IGMA has two IDs for differentiating users. The first ID is a bit-level interleave pattern (denoted with I). The second ID is a grid-mapping pattern (denoted with G). When two adjacent cells adopt the IGMA, and serve users with the same block of time-frequency resource, it may cause conflict of multiple access resources among users, and problems of an inter-cell interference.

A bit-level interleave pattern set of a target BS is denoted with $I_A=\{I_{A-1}, I_{A-2}, \ldots, I_{A-TA_1}\}$. That is, there are $TA_1$ available bit-level interleave patterns in total. A grid-mapping pattern set of the target BS is denoted with $G_A=\{G_{A-1}, G_{A-2}, \ldots, G_{A-TA_2}\}$. That is, there are $TA_2$ available grid-mapping patterns in total.

Similarly, a bit-level interleave pattern set of an interfering BS is denoted with $I_B=\{I_{B-1}, I_{B-2}, \ldots, I_{B-TB_1}\}$. That is, there are $TB_1$ available bit-level interleave patterns in total. A grid-mapping pattern set of the interfering BS is denoted with $G_B=\{G_{B-1}, G_{B-2}, \ldots, G_{B-TB_2}\}$. That is, there are $TB_2$ available grid-mapping patterns in total.

When not performing an individualized configuration, $I_A$ and $I_B$ may include the same bit-level interleave pattern. Similarly, $G_A$ and $G_B$ may include the same grid-mapping pattern. And then, for users within different cells, collision of multiple access resources may occur, thereby causing failed decoding.

In the embodiment, after exchanging information between the target BS and the interfering BS, the configurations are as follows. The bit-level interleave pattern sets of the target BS and interfering BS are the same. The grid-mapping pattern sets of the target BS and the interfering BS are also the same. However, for the target BS and the interfering BS, combination sets of bit-level interleave pattern and grid-mapping pattern are different. At this time, as shown in FIG. 13, $TA_1=TA_2=TA$, $TB_1=TB_2=TB$, and $I_AG_A \neq I_BG_B$.

In a grant-based transmission, the target BS and interfering BS may allocate different bit-level interleave patterns and/or grid-mapping patterns for a user of respective cell, based on respectively configured resource set, and inform the user by using a downlink channel. The user may process and transmit data, by using the allocated bit-level interleave pattern and grid-mapping pattern. The BS identifies users within the cell, by using a combination of bit-level interleave pattern and grid-mapping pattern in a multiple access resource set. A particular rule is as follows. After processing the same data sequence with different combinations of bit-level interleave sequence and grid-mapping pattern, different data sequences are obtained. At this time, the following methods are used to differentiate users within the cell:

1. Differentiate users within the cell, by using a bit-level interleave pattern. And then, users within the same cell must be allocated with different bit-level interleave patterns. At this time, the grid-mapping patterns of users within the same cell may be the same. The bit-level interleave patterns of users within different cells may be the same. However, for users within different cells, combinations of bit-level interleave pattern and grid-mapping pattern are different.
2. Differentiate users within the cell, by using a grid-mapping pattern. And then, users within the same cell are allocated with different grid-mapping patterns. At this time, the bit-level interleave patterns of users within the same cell may be the same. The grid-mapping patterns within different cells may be the same. However, for users within various cells, combinations of bit-level interleave pattern and grid-mapping pattern are different.
3. Differentiate users within the cell, by using a combination of bit-level interleave pattern and grid-mapping pattern. And then, for users within the same cell, or within different cells, the allocated bit-level interleave patterns and grid-mapping patterns are not the same simultaneously.

To better deal with the inter-cell interference, a special configuration scheme may be adopted. The BSs may allocate orthogonal grid-mapping patterns for adjacent cells. However, non-orthogonal grid-mapping patterns may be configured within the same cell. Thus, it may be guaranteed that there is almost no interference for signals in the target BS, which comes from signals in the interfering BS. Specifically, the configuration rule of adjacent cells is as follows:

1. Firstly configure an orthogonal combination of bit-level interleave patterns and grid-mapping patterns for adjacent cells.
2. When there is no orthogonal grid-mapping pattern, firstly configure a semi-orthogonal combination of bit-level interleave patterns and grid-mapping patterns for adjacent cells.
3. When there is no orthogonal or semi-orthogonal grid-mapping pattern, configure a non-orthogonal combination of bit-level interleave patterns and grid-mapping patterns for adjacent cells.

The configuration scheme of foregoing grid-mapping pattern may also be applied to a grant-free (competition-based) transmission mode. Similar to the grant-based transmission, firstly exchanging information among BSs, determine an available resource set of bit-level interleave pattern and grid-mapping pattern within the cell, which is configured by the BS. The specific methods are as follows:

1. When the grant-free scheme is to freely select resources by a user, a BS informs the user about information of an available resource set, which includes bit-level interleave patterns and grid-mapping patterns, by using a downlink channel (including: a physical broadcast channel, a PDCCH, a PDSCH, and so on). And then, the user selects the adopted bit-level interleave pattern and grid-mapping pattern from the resource set.
2. When the grant-free scheme is to allocate multiple access resources for a user by a BS. Similar to the grant-based scheme, the BS informs the user about allocated bit-level interleave pattern and grid-mapping pattern, by using a downlink channel. However, different from the grant-based scheme, at this time, different users may be allocated with the same bit-level interleave pattern and/or grid-mapping pattern.

Embodiment 4

In foregoing Embodiment 1 to Embodiment 3, solution of the present disclosure is described, by using the IGMA with two multiple access resource IDs. However, some other MA schemes only have one multiple access resource ID, such as sparse codebook of SCMA, codebook matrix sequence of PDMA, complex spreading sequence of MUSA, and so on. However, after extension, when simultaneously adopting DMRS resources to differentiate users, foregoing several MA solutions will possess two multiple access resource IDs. In the embodiment, how to enforce the solution for suppressing/cancelling an inter-cell interference in the present disclosure will be described, based on the MA scheme with a DMRS auxiliary single ID.

Figure 14:
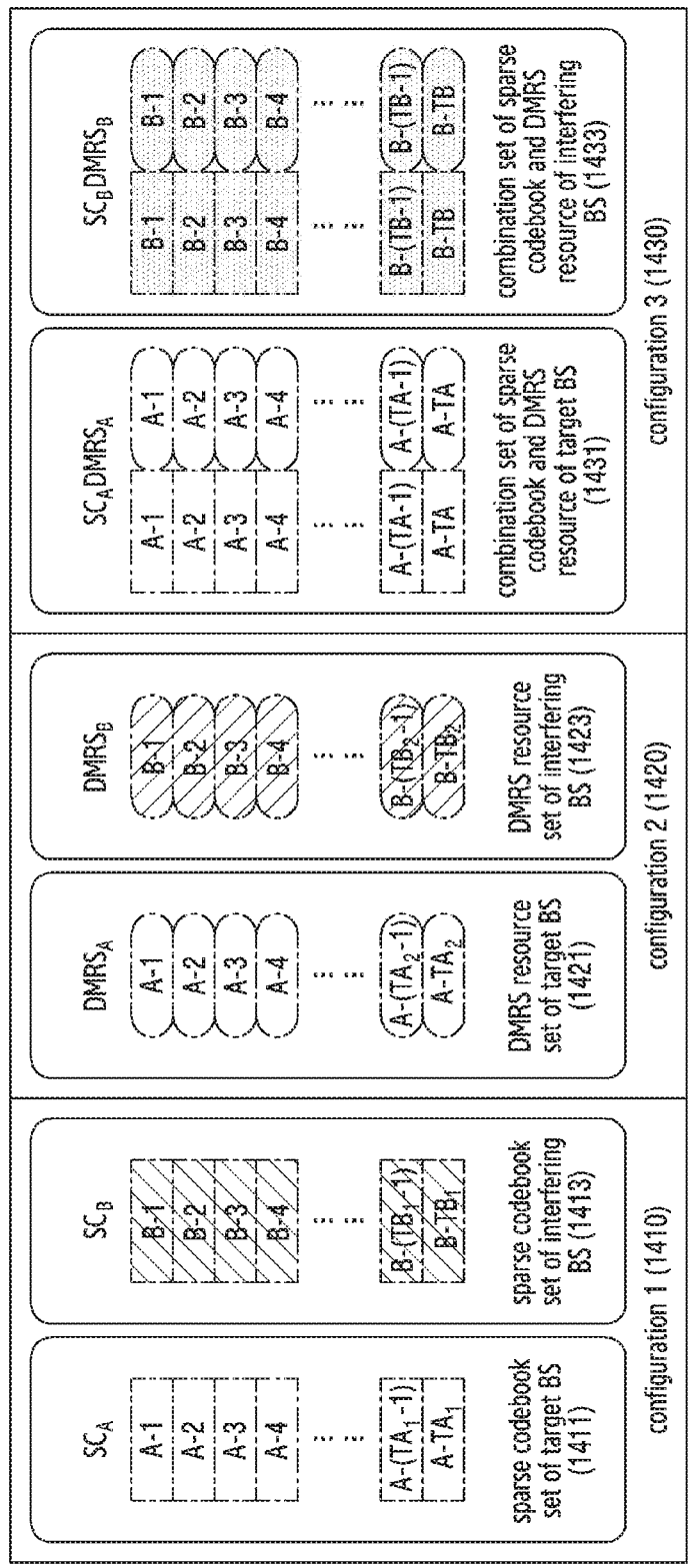
FIG. 14 illustrates an example of configurations of multiple access resources among cells, in which the cells possess different sparse codebooks and/or different De Modulation Reference Signal (DMRS) resources in a wireless communication system according to forth embodiment of the present disclosure.

FIG. 14 illustrates an example of configurations of multiple access resources among cells, in which the cells possess different sparse codebooks and/or different De Modulation Reference Signal (DMRS) resources in a wireless communication system according to forth embodiment of the present disclosure. The FIG. 14 includes a configuration 1 1410, a configuration 2 1420 and a configuration 1430. The configuration 1 1410 includes sparse codebook set of the target BS 1411 and sparse codebook set of interfering BS 1413. The configuration 2 1420 includes DMRS resource set of target BS 1421 and DMRS resource set of interfering BS 1423. The configuration 3 1433 includes combination set of sparse codebook and MDRS resource of the target BS 1431 and combination set of sparse codebook and DMRS resource of the interfering BS 1423.

When two adjacent cells adopt the SCMA scheme, and serve users with the same block of time-frequency resources, it may cause conflict of multiple access resources among users, and problems of inter-cell interferences.

Denote the multiple access resource ID of SCMA scheme with SC. A sparse codebook set of a target BS is denoted with $SC_A = \{SC_{A-1}, SC_{A-2}, \ldots, SC_{A-TA_1}\}$. That is, there are $TA_1$ available sparse codebooks in total. Similarly, a sparse codebook set of an interfering BS is denoted with $SC_B = \{SC_{B-1}, SC_{B-2}, \ldots, SC_{B-TB_1}\}$. That is, there are $TB_1$ available sparse codebooks in total.

In addition, a user will adopt DMRS to transmit data. The BS adopts DMRS to detect channel information of the user. In the embodiment, the DMRS resource is taken as an ID for differentiating users, which is denoted with DMRS. And then, the available DMRS resource set of the target BS is denoted with $DMRS_A = \{DMRS_{A-1}, DMRS_{A-2}, \ldots, DMRS_{A-TA_2}\}$. That is, there are $TA_2$ available DMRS resources. An available DMRS resource set of the interfering BS is denoted with $DMRS_B = \{DMRS_{B-1}, DMRS_{B-2}, \ldots, DMRS_{B-TB_2}\}$. That is, there are $TB_2$ available DMRS resources in total.

When not performing an individualized configuration, $SC_A$ and $SC_B$ may include the same sparse codebook. Alternatively, $DMRS_A$ and $DMRS_B$ include the same demodulation pilot resources. Subsequently, for users within different cells, resource collision may occur, thereby causing failed decoding.

Similar to the configuration scheme of IGMA, in the embodiment, after exchanging information between the target BS and interfering BS, the configuration for an adjacent BS may be as follows. Identify whether a user is within the cell, by using different sparse codebook sets (configuration 1), or different DMRS resource sets (configuration 2), or different combination sets of sparse codebooks and DMRS resources (configuration 3), which is shown in FIG. 14.

In a grant-based case, the target BS and interfering BS allocate different sparse codebooks and/or DMRS resources for a user within respective cell, based on respectively configured resource set, and inform the user with a downlink channel. The user processes and transmits data, by using the allocated sparse codebook and DMRS resource. However, the BS identifies users within the cell, by using the sparse codebook and/or DMRS resource in the multiple access resource set. At this time, the following methods are used to differentiate users within the cell:
1. Differentiate users within the cell based on the sparse codebook. And then, users within the same cell must be allocated with different sparse codebooks.
2. Differentiate users within the cell based on the DMRS resource. And then, users within the same cell must be allocated with different DMRS resources.
3. Differentiate users within the same cell, based on a combination of sparse codebook and DMRS resource. And then, users within the same cell must be allocated with different combinations of sparse codebook and DMRS. Thus, different users may have the same sparse codebook and different DMRS resources, or different sparse codebooks and the same DMRS resource, or different sparse codebooks and different DMRS resources.

The configuration scheme of foregoing sparse codebook is also applicable to a grant-free (competition-based) transmission mode. Similar to the grant-based transmission, firstly exchange information among BSs, determine an available set of sparse codebook and DMRS resource within the cell, which is configured by the BS. Specific methods may be as follows:
1. When the grant-free scheme is to freely select resources by a user, the BS informs the user about information of an available resource set, which includes sparse codebook and DMRS resource, by using a downlink channel (including: a physical broadcast channel, a PDCCH, a PDSCH, and so on). And then, the user selects the adopted sparse codebook and DMRS resource from the resource set.
2. When the grant-free scheme is to allocate multiple access resources for a user by a BS, similar to the grant-based scheme, the BS informs the user about allocated sparse codebook and DMRS resource, by using a downlink channel. However, different from the grant-based scheme, different users may be allocated with the same sparse codebook and/or DMRS resource at this time.

After a simple replacement, the configuration method in the embodiment may be directly applied to other MA schemes. For example, replace the sparse codebook with codebook matrix sequence of PDMA, or complex spreading sequence of MUSA, or IDMA interleaver, which may be applied to configurations among cells with PDMA, or MUSA, or IDMA.

Embodiment 5

In foregoing Embodiment 1 to Embodiment 3, solution of the present disclosure is described, by using the IGMA with two multiple access resource IDs. However, some MA schemes only have one multiple access resource ID, such as sparse codebook of SCMA, codebook matrix sequence of PDMA, complex spreading sequence of MUSA, and so on. When not considering how to differentiate users with DMRS resources simultaneously, foregoing several MA schemes only have one multiple access resource ID. In the embodiment, how to enforce the solution for suppressing/cancelling an inter-cell interference in the present disclosure is described, by using a MA scheme with a single multiple access resource ID.

Figure 15:
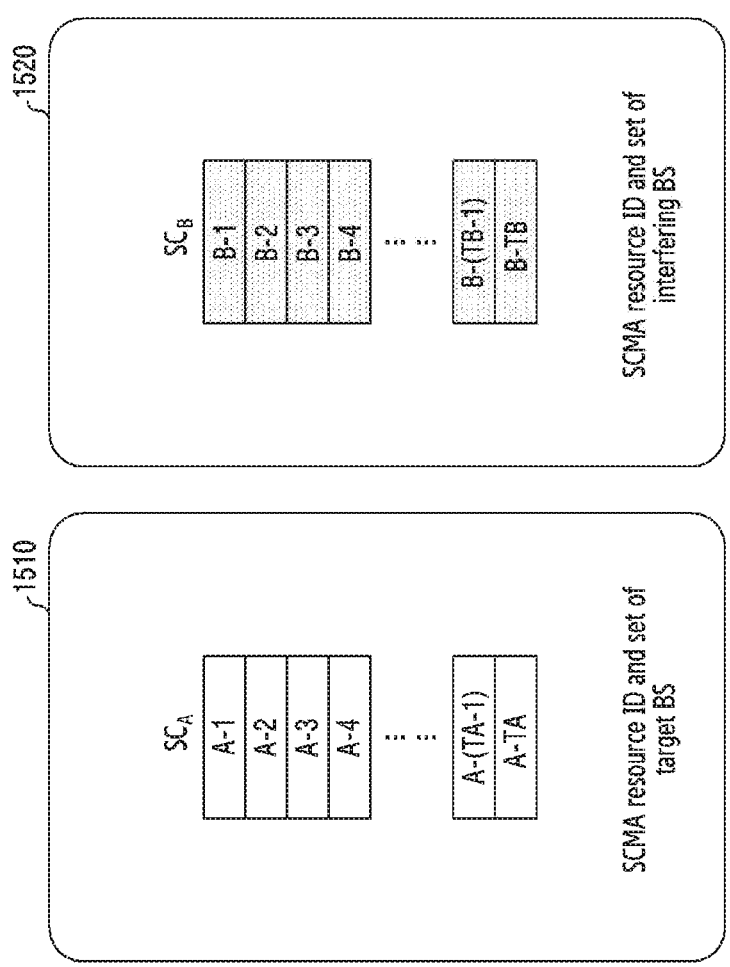
FIG. 15 illustrates an example of configurations of multiple access resources among cells with different sparse codebooks in a wireless communication system according to fifth embodiment of the present disclosure.

FIG. 15 illustrates an example of configurations of multiple access resources among cells with different sparse codebooks in a wireless communication system according to fifth embodiment of the present disclosure. The FIG. 15 includes SCMA resource ID and set of the target BS 1510 and SCMA resource ID and set of the interfering BS 1520.

When two adjacent cells adopt the SCMA scheme, and serve users with the same block of time-frequency resource, it may cause conflict of multiple access resources among users, and problems of inter-cell interferences.

Denote the multiple access resource ID of SCMA scheme with SC. A sparse codebook set of a target BS is denoted with $SC_A=\{SC_{A-1}, SC_{A-2}, \ldots, SC_{A-TA}\}$. That is, there are TA available sparse codebooks in total. Similarly, a sparse codebook set of an interfering BS is denoted with $SC_B=\{SC_{B-1}, SC_{B-2}, \ldots, SC_{B-TB}\}$. That is, there are TB available sparse codebooks in total. When not performing an individualized configuration, $SC_A$ and $SC_B$ may include the same sparse codebook. And then, for users within different cells, collision of multiple access resources may occur, thereby causing failed decoding.

In a grant-based transmission, the target BS and interfering BS allocate different sparse codebooks for a user in respective cell, based on respectively configured resource set, and inform the user with a downlink channel. The user processes and transmits data, by using the allocated sparse codebook. However, the BS identifies users within the cell, by using the sparse codebook in the multiple access resource set. At this time, differentiate users within the cell by using the sparse codebook.

The configuration scheme of foregoing sparse codebook is also applicable to a grant-free (competition-based) transmission mode. Similar to the grant-based transmission, firstly exchange information among BSs, determine an available resource set of sparse codebook within the cell, which is configured by the BS. Specific methods may be as follows:
 1. When the grant-free scheme is to freely select resources by a user, a BS informs the user about information of an available sparse codebook resource set, by using a downlink channel (including: a physical broadcast channel, a PDCCH, a PDSCH, and so on). And then, the user selects the adopted sparse codebook from the resource set.
 2. When the grant-free scheme is to allocate multiple access resources for a user by a BS, similar to the grant-based scheme, the BS informs the user about allocated sparse codebook, by using a downlink channel. However, different from the grant-based scheme, different users may be allocated with the same sparse codebook at this time.

After a simple replacement, the configuration scheme in the embodiment may be applied to other MA schemes, each of which has a single multiple access resource ID. For example, replace the sparse codebook in SCMA with codebook matrix sequence of PDMA, and then apply to configurations among cells with PDMA. Replace the sparse codebook in SCMA with complex spreading sequence of MUSA, and then apply to configurations among cells with MUSA. Replace the sparse codebook in SCMA with IDMA interleaver, and then apply to configurations among cells with IDMA, and so on.

In the embodiment, after exchanging information between the target BS and interfering BS, the configuration is as follows. Identify whether a user is within the cell, by using different sparse codebook sets. As shown in FIG. 15, $SC_A \neq SC_B$.

Embodiment 6

The foregoing embodiments have described how to configure different multiple access resource sets, so as to differentiate users within various cells. Meanwhile, effects of reducing, or even cancelling interferences may be obtained, e.g., adopt orthogonal grid-mapping patterns. However, for some MA schemes, interference cancellation cannot be achieved. Thus, although a target BS may identify which users are within the cell, certain interference may still be generated for users within the cell, since interfering users transmit signals with the same time-frequency resources. The processes for cancelling an inter-cell interference are further described in the embodiment, on the basis of differentiating users within various cells.

The embodiment assumes that: for two adjacent cells with the same MA scheme, such as: SCMA, MUSA, PDMA, IGMA, or IDMA, and so on, configure respectively used multiple access resources, based on methods in foregoing embodiments. In the embodiment, no matter there are how many multiple access resource IDs of the used MA scheme, a multiple access resource set used by the target BS is denoted with $MA_A=\{MA_{A-1}, MA_{A-2}, \ldots, MA_{A-TA}\}$, which means that there are TA available multiple access resources (or combinations of multiple access resources). A multiple access resource set used by an interfering BS is denoted with $MA_B=\{MA_{B-1}, MA_{B-2}, \ldots, MA_{B-TB}\}$, which means that there are TB available multiple access resources (or combinations of multiple access resources). A BS identifies whether a user is within a cell, by using different sets of multiple access resources.

Figure 16:
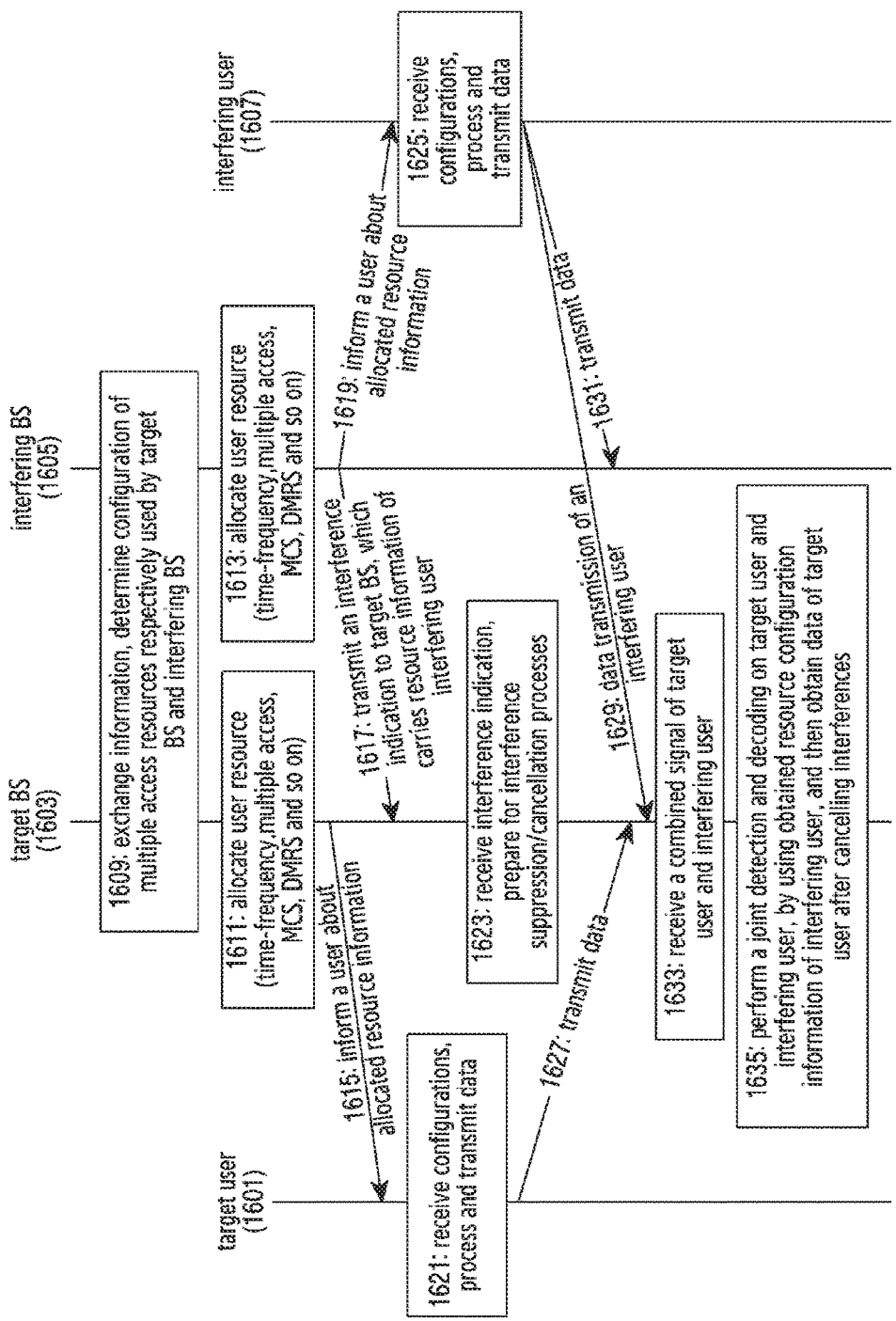
FIG. 16 illustrates a flowchart for representing how to cancel an inter-cell interference by adopting a grant-based transmission mode in a wireless communication system according to sixth embodiment of the present disclosure.

FIG. 16 illustrates a flowchart for representing how to cancel an inter-cell interference by adopting a grant-based transmission mode in a wireless communication system according to sixth embodiment of the present disclosure. FIG. 16 shows a method of operation of a target user 1601, a target BS 1603, an interfering BS 1605, and an interfering user 1607

Referring to FIG. 16, in step 1609, the target BS and interfering BS exchange information, determine configuration of multiple access resources respectively used by target BS and interfering BS. That is, after exchanging information among BSs, the target BS and the interfering BS may determine an available multiple access resource set for each BS.

In step 1611, the target BS allocates user resource (time-frequency, multiple access, MCS, DMRS, and so on). That is, the target BS may allocate multiple access resources for a user within a cell served by the target BS, and inform the user about information of allocated multiple access resources.

In step 1613, the interfering BS allocates user resource (time-frequency, multiple access, MCS, DMRS, and so on). That is, the interfering BS may allocate multiple access resources for a user within a cell served by the interfering BS, and inform the user about information of allocated multiple access resources. According to various embodiments of the present disclosure, steps 1611 and 1613 may be performed simultaneously or sequentially.

In step 1615, the target BS informs a user about allocated resource information.

In step 1617, the interfering BS transmits an interference indication to the target BS, which carries resource information of the interfering user. That is, the interfering BS may transmit an interference indication to the target BS, and inform the target BS about information, such as multiple access resources, encoding modulation mode, DMRS resource, which are adopted by interfering users; after receiving the interference indication, the target BS may prepare for suppressing/cancelling interferences.

In step 1619, the interfering BS informs a user about allocated resource information. According to various embodiments of the present disclosure, steps 1615 to 1619 may be performed simultaneously or sequentially.

In step 1621, the target user receives configurations, processes and transmits data. That is, the user may process and transmit to-be-transmitted data, by using the allocated multiple access resources and other information.

In step 1623, the target BS receives interference indication, and prepares for interference suppression and cancellation processes.

In step 1625, the interfering BS receives configurations, processes and transmits data. According to various embodiments of the present disclosure, steps 1621 to 1625 may be performed simultaneously or sequentially.

In step 1627, the target user transmits data to the target BS.

In step 1629, the interfering user transmits data of the interfering user to the target BS.

In step 1631, the interfering user transmits data to the interfering BS. According to various embodiments of the present disclosure, steps 1627 to 1631 may be performed simultaneously or sequentially.

In step 1633, the target BS receives a combined signal of a target user and an interfering user.

In step 1635, the target BS performs a joint detection and decoding to the received combined signal, which comes from a user within the cell and users in the interfering cell, by using allocated multiple access resources of the user within the cell, and multiple access resources of interfering users obtained after interacting with the interfering cell, so as to correctly decode the data of the user coming from the cell, and cancel interferences.

Figure 17:
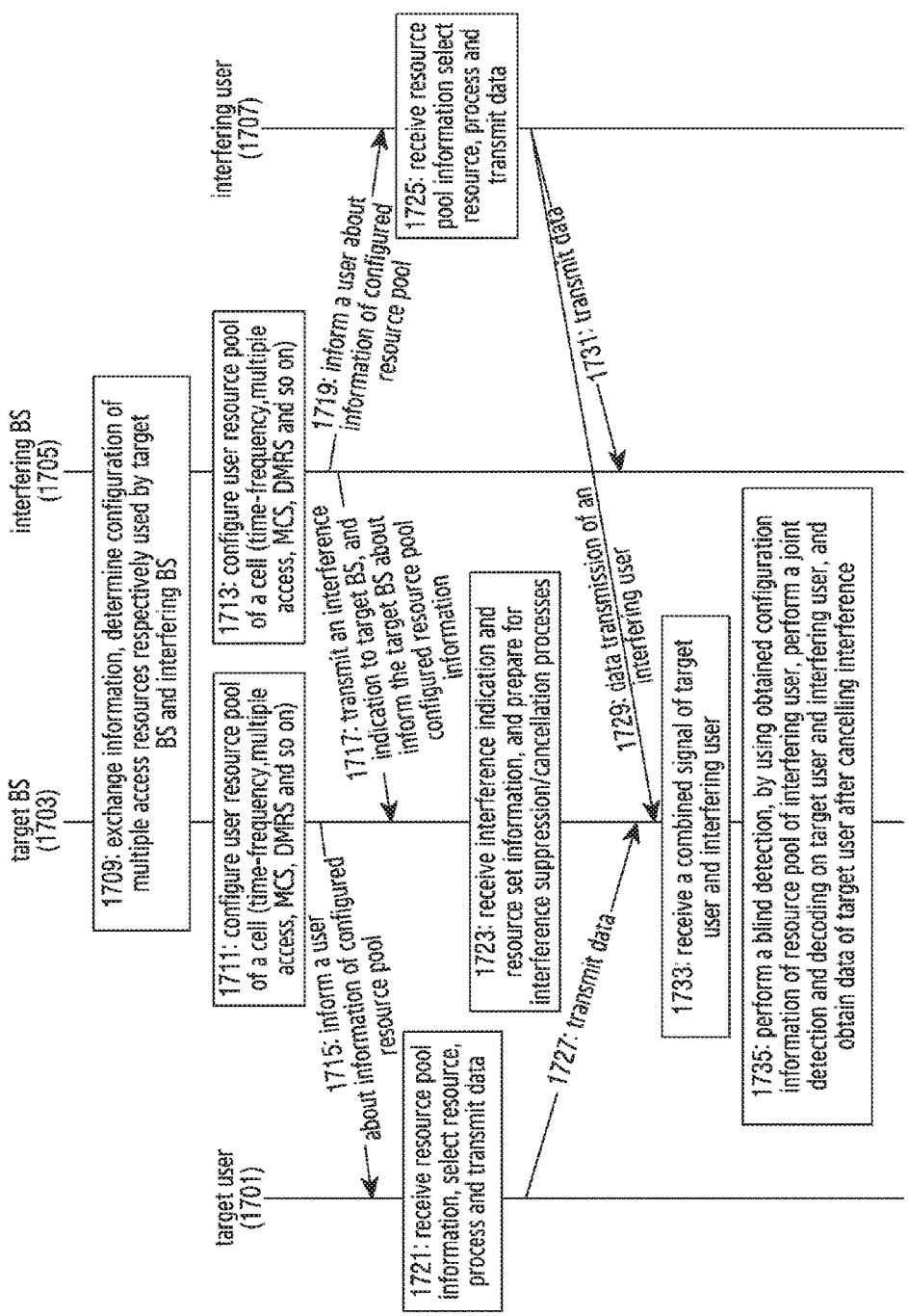
FIG. 17 illustrates a flowchart for representing how to cancel an inter-cell interference based on a grant-free transmission mode (a), in a wireless communication system according to sixth embodiment of the present disclosure.

FIG. 17 illustrates a flowchart for representing how to cancel an inter-cell interference based on a grant-free transmission mode (a), in a wireless communication system according to sixth embodiment of the present disclosure. That is, when a user adopts a grant-free transmission mode, and freely selects multiple access resources, a processing flow for cancelling an inter-cell interference in the embodiment is shown in FIG. 17. FIG. 17 shows a method of operation of a target user 1701, a target BS 1703, an interfering BS 1705, and an interfering user 1707

Referring to FIG. 17, in step 1709, the target BS and interfering BS exchange information, determine configuration of multiple access resources respectively used by target BS and interfering BS. That is, after exchanging information among BSs, the target BS and the interfering BS determine an available multiple access resource set of each BS.

In step 1711, the target BS configures user resource pool of a cell (time-frequency, multiple access, MCS, DMRS, and so on). That is, the target BS may configure a multiple access resource set, which is selectable by a user within a cell served by the target BS, and inform the user by using a downlink channel.

In step 1713, the interfering BS configures user resource pool of a cell (time-frequency, multiple access, MCS, DMRS, and so on). That is, the interfering BS may configure a multiple access resource set, which is selectable by a user within a cell served by the interfering BS, and inform the user by using a downlink channel.

In step 1715, the target BS informs a user about information configured resource pool.

In step 1717, the interfering BS transmits an interference indication to the target BS, and informs the target BS about configured resource pool information. That is, the interfering BS may transmit an interference indication to the target BS, and informs the target BS about information of configured multiple access resource set in the interfering BS, and information of available DMRS resources.

In step 1719, the interfering BS informs a user about information of configured resource pool. According to various embodiments of the present disclosure, steps 1715 to 1719 may be performed simultaneously or sequentially.

In step 1721, the target user receives configurations, processes and transmits data. That is, the users may select respectively used resource information, by using received information, such as information about multiple access resource set, and then process and transmit data based on the selected resources.

In step 1723, the target BS receives interference indication and resource set information, and prepares for interference suppression and cancellation processes.

In step 1725, the interfering user receives resource pool information, selects resource, processes and transmits data. According to various embodiments of the present disclosure, steps 1721 to 1625 may be performed simultaneously or sequentially.

In step 1727, the target user transmits data to the target BS.

In step 1729, the interfering user transmits data of the interfering user to the target BS.

In step 1731, the interfering user transmits data to the interfering BS. According to various embodiments of the present disclosure, steps 1727 to 1731 may be performed simultaneously or sequentially.

In step 1733, the target BS receives a combined signal of a target user and an interfering user.

In step 1735, the target BS performs a blind detection, by using obtained configuration information of resource pool of interfering user, performs a joint detection and decoding on the target user and the interfering user, and obtains data of the target user after cancelling interference. That is, the target BS may perform a joint detection and decoding to the combined signal, which comes from the user within the cell and interfering user, based on configurations of multiple access resource set and other information, so as to decode data of the target user. It should be noted that, at this time, the target BS needs to perform a blind detection for all the possibilities.

For example, the target BS may receive, from an adjacent BS, information associated with a first multiple access resource configured for a serving terminal of the adjacent BS, configure a second multiple access resource for a serving terminal of the BS based on the information of the first multiple access resource, transmit, to the serving terminal of the BS, information associated with the second multiple access resource, and receive, from the serving terminal of the BS, data allocated based on the second multiple access resource. The second multiple access resource is different from the first multiple access resource.

Figure 18:
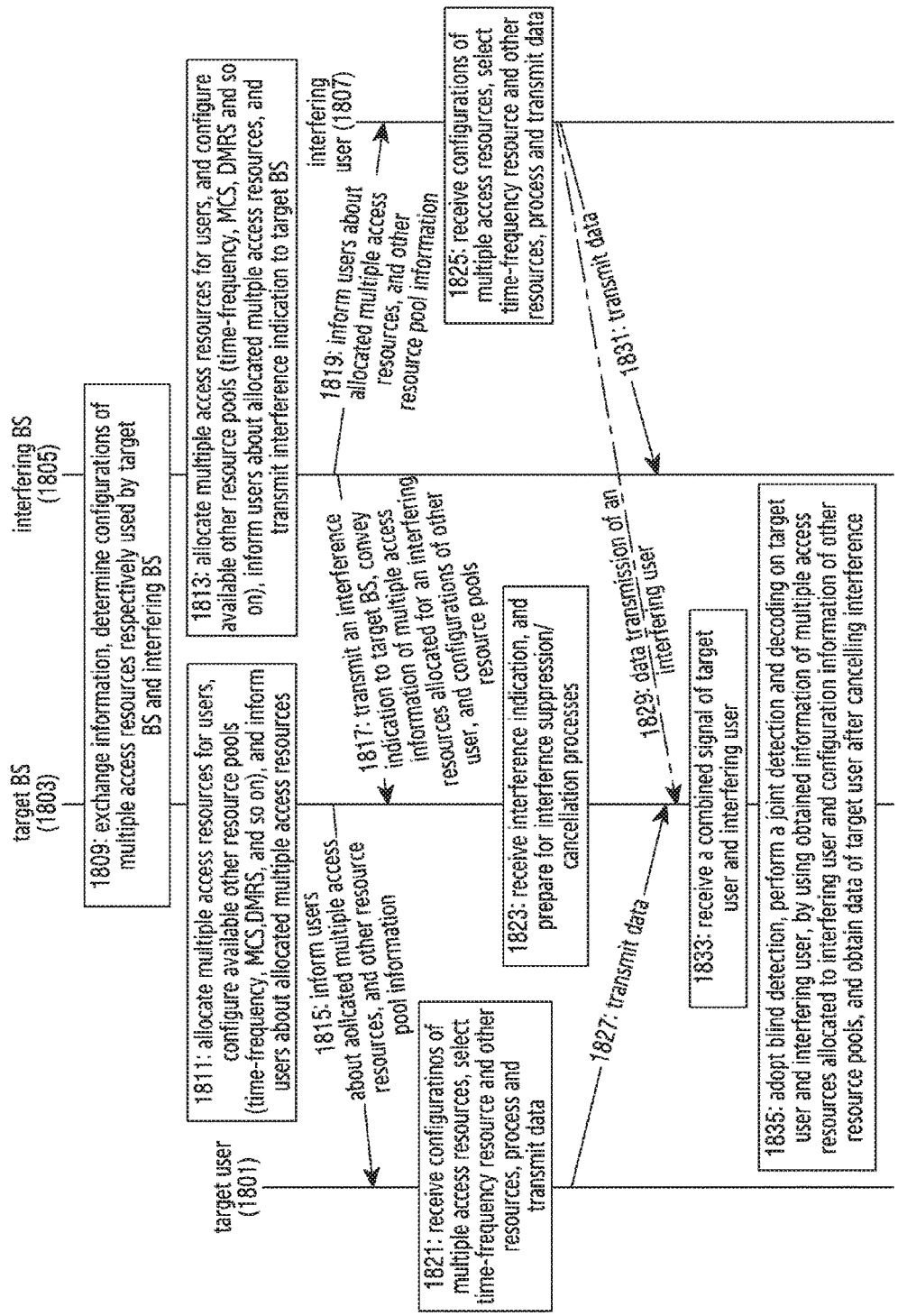
FIG. 18 illustrates a flowchart for representing how to cancel an inter-cell interference, based on a grant-free transmission mode (b) in a wireless communication system according to sixth embodiment of the present disclosure.

FIG. 18 illustrates a flowchart for representing how to cancel an inter-cell interference, based on a grant-free transmission mode (b) in a wireless communication system according to sixth embodiment of the present disclosure. FIG. 18 shows a method of operation of a target user 1801, a target BS 1803, an interfering BS 1805, and an interfering user 1807. That is, when a user adopts a grant-free transmission mode, and a BS allocates multiple access resources for the user, a processing flow for cancelling an inter-cell interference in the embodiment is shown in FIG. 18.

Referring to FIG. 18, in step 1809, the target BS and interfering BS exchange information, determine configurations of multiple access resources respectively used by target BS and interfering BS. that is, after exchanging information among BSs, determine an available multiple access resource set of each BS.

In step 1811, the target BS allocates multiple access resources for users, and configures available other resource pools (time-frequency, MCS, DMRS, and so on). That is, for a user in a cell served by the target BS, the target BS may allocate used multiple access resources, available time-frequency resources and DMRS for the user, and inform the user about foregoing information.

In step 1813, the interfering BS allocates multiple access resources for users, and configures available other resource pools (time-frequency, MCS, DMRS, and so on). That is, for a user in a cell served by the interfering BS, the interfering BS may allocate used multiple access resources, available time-frequency resources and DMRS for the user, and inform the user about foregoing information. According to various embodiments of the present disclosure, steps 1811 and 1813 may be performed simultaneously or sequentially.

In step 1815, the target BS informs users about allocated multiple access resources, and other resource pool information.

In step 1817, the interfering BS transmits an interference indication to the target BS, conveys information of multiple access resources allocated for the interfering user, and configurations of other resource pools. That is, the interfering BS may transmit the interference indication to the target BS, and inform the target BS about available multiple access resources of possible interfering users, possible encoding modulation mode, and DMRS resources.

In step 1819, the interfering BS informs users about allocated multiple access resources, and other resource pool information.

In step 1821, the target user receives configurations of multiple access resources and selects time-frequency resource and other resources, processes and transmits data. That is, the user may select the used resources, such as time-frequency resources, modulation encoding modes, and so on, based on the received information about allocated multiple access resources, process and transmit data by using the selected resources.

In step 1823, the target BS receives interference indication, and prepares for interference suppression and cancellation processes.

In step 1825, the interfering BS receives configurations of multiple access resources, selects time-frequency resource and other resources, processes and transmits data. According to various embodiments of the present disclosure, steps 1821 to 1825 may be performed simultaneously or sequentially.

In step 1827, the target user transmits data to the target BS.

In step 1829, the interfering user transmits data of the interfering user to the target BS.

In step 1831, the interfering user transmits data to the interfering BS. According to various embodiments of the present disclosure, steps 1827 to 1831 may be performed simultaneously or sequentially.

In step 1833, the target BS receives a combined signal of the target BS and the interfering user.

In step 1835, the target BS performs a joint detection and decoding to the combined signal, which comes from the user within the cell and an interfering user, based on the allocation configuration of multiple access resources and other information. It should be noted that, at this time, the target BS needs to perform a blind detection to all the possibilities. Although users have been allocated with multiple access resources, the BS does not learn whether a user has transmitted data, so as to decode data of the target user.

Embodiment 7

The first embodiment describes how to configure orthogonal grid-mapping patterns among cells with IGMA, so as to cancel an inter-cell interference. The embodiment describes how to operate to cancel interferences among cells, which adopt SCMA.

Similar to the orthogonal grid-mapping patterns in IGMA, the orthogonality definition for SCMA codebook in the embodiment is as follows:

1. When REs occupied by data symbols are not overlapped at all, in which the data symbols are obtained after mapping the same data to different codebooks, such different codebooks are referred to as orthogonal codebooks.
2. When REs occupied by data symbols are partially-overlapped, in which the data symbols are obtained after mapping the same data to different codebooks, such different codebooks are referred to as semi-orthogonal codebooks.
3. When REs occupied by data symbols are totally overlapped, in which the data symbols are obtained after mapping the same data to different codebooks, such different codebooks are referred to as non-orthogonal codebooks.

A general configuration scheme of SCMA may refer to foregoing embodiments, which is not repeated here. When users coming from various cells are differentiated, by configuring different codebooks for different cells, there is still a special rule to reduce the inter-cell interference. After mapping and processing with codebook, data of a user will be sparsely mapped to time-frequency REs.

Thus, to better deal with an inter-cell interference, the embodiment adopts a special configuration scheme, so as to allocate orthogonal codebook sets for adjacent cells. However, non-orthogonal codebook sets may be configured within the same cell. Thus, it may be guaranteed that there is almost no interference to signals in the target BS, which comes from signals in the interfering BS. Specifically, the configuration rule of adjacent cells may be as follows:

1. Configure mutual orthogonal codebooks for adjacent cells.
2. When there is no orthogonal codebook, configure semi-orthogonal codebooks for adjacent cells.
3. When there is no orthogonal codebook, or semi-orthogonal codebook, configure non-orthogonal codebooks for adjacent cells.

The foregoing configuration scheme of sparse codebook is also applicable to a grant-free (competition-based) transmission mode. Similar to a grant-based scheme, firstly exchanging information among BSs, determine an available codebook resource set within a cell, which is configured by a BS. The specific methods may be as follows:

1. When the grant-free scheme is to freely select resources by a user, a BS informs the user about information of an available codebook resource set, by using a downlink channel (including a physical broadcast channel, a PDCCH, a PDSCH, and so on). And then, the user selects adopted codebook from the resource set.
2. When the grant-free scheme is to allocate multiple access resources for a user by a BS, similar to the grant-based scheme, the BS informs the user about allocated codebook information, by using a downlink channel. However, different from the grant-based scheme, different users may be allocated with the same codebook at this time.

Embodiment 8

The first embodiment describes how to cancel an inter-cell interference, by configuring orthogonal grid-mapping patterns among cells with IGMA. The embodiment describes how to operate to cancel interferences among cells with PDMA.

Similar to the orthogonal grid-mapping patterns in the IGMA, the orthogonality definition for codebook matrix sequence of PDMA in the embodiment is as follows:

1. When REs occupied by data symbols are not overlapped at all, in which the data symbols are obtained after mapping the same data to different codebook matrix sequences, such different codebook matrix sequences are referred to as orthogonal codebook matrix sequences.
2. When REs occupied by data symbols are partially-overlapped, in which the data symbols are obtained after mapping the same data to different codebook matrix sequences, such different codebook matrix sequences are referred to as semi-orthogonal codebook matrix sequences.
3. When REs occupied by data symbols are totally overlapped, in which the data symbols are obtained after mapping the same data to different codebook matrix sequences, such different codebook matrix sequences are referred to as non-orthogonal codebook matrix sequences.

A general configuration scheme of SCMA may refer to foregoing embodiments, which is not repeated here. When users coming from various cells are differentiated, by configuring different codebook matrix sequences for different cells, there is still a special rule to reduce the inter-cell interference. After mapping and processing with a codebook matrix sequence, user data is sparsely mapped to time-frequency REs.

Thus, to better deal with the inter-cell interference, the embodiment adopts a special configuration scheme, so as to allocate orthogonal codebook matrix sequence sets for adjacent cells. However, non-orthogonal codebook matrix sequence sets may be configured with the same cell. Thus, it may be guaranteed that there is almost no interference to signals in the target BS, which comes from signals in the interfering BS. Specifically, the configuration rule of adjacent cells is as follows:

1. Firstly configure mutual orthogonal codebook matrix sequences for adjacent cells.
2. When there is no orthogonal codebook matrix sequence, firstly configure semi-orthogonal codebook matrix sequences for adjacent cells.
3. When there is no orthogonal codebook matrix sequence, or semi-orthogonal codebook matrix sequence, configure non-orthogonal codebook matrix sequences for adjacent cells.

The foregoing configuration scheme of codebook matrix sequence is also applicable to a grant-free (competition-based) transmission mode. Similar to the grant-based transmission, firstly exchanging information among BSs, determine a resource set of available codebook matrix sequences within the cell, which is configured by the BS. Specific methods may be as follows:

1. When the grant-free scheme is to freely select resources by a user, a BS informs the user about a resource set of available codebook matrix sequences, by using a downlink channel (including: a physical broadcast channel, a PDCCH, a PDSCH, and so on). And the user selects the adopted codebook matrix sequence from the resource set.
2. When the grant-free scheme is to allocate multiple access resources for a user by a BS, similar to the grant-based scheme, the BS informs the user about information of allocated codebook matrix sequence, by using a downlink channel. However, different from the grant-based scheme, different users may be allocated with the same codebook matrix sequence at this time.

Embodiment 9

The foregoing embodiment describes how to determine configurations of multiple access resources of respective cell, by exchanging information among adjacent cells. The embodiment will provide a detailed description about a flow for exchanging information among adjacent BSs, and a flow for configuring and interacting among adjacent BSs, when there are multiple interference cells.

When cell A and cell B adopt the same MA scheme, such as SCMA, MUSA, PDMA, IGMA or IDMA, foregoing MA scheme possesses N IDs for differentiating users, which are respectively denoted with $MA_1, MA_2, \ldots, MA_N$. There are $T_n$ ($0 < n \leq N$) options for each multiple access resource ID, e.g., first ID $MA_1 = \{MA_{1-1}, MA_{1-2}, \ldots, MA_{1-T1}\}$, second ID $MA_2 = \{MA_{2-1}, MA_{2-2}, \ldots, MA_{2-T2}\}$, and so on.

Figure 19:
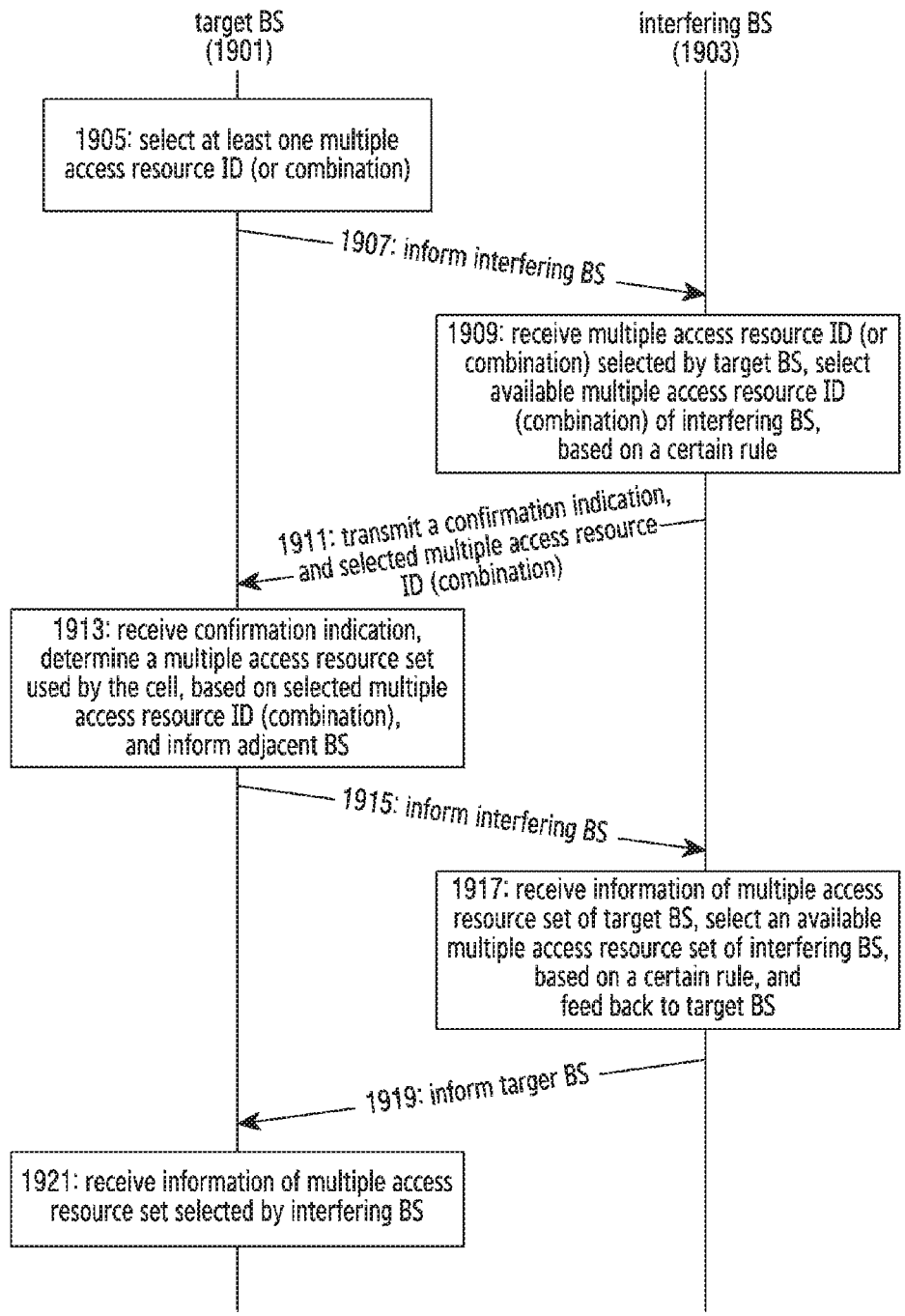
FIG. 19 illustrates a flowchart for representing a first method for determining a multiple access resource set, by exchanging information among adjacent cells in a wireless communication system according to ninth embodiment of the present disclosure.

FIG. 19 illustrates a flowchart for representing a first method for determining a multiple access resource set, by exchanging information among adjacent cells in a wireless communication system according to ninth embodiment of the present disclosure. That is, FIG. 15 illustrates a flowchart for two cells to determine respectively used multiple access resource set, by exchanging information between the two cells. As shown in FIG. 15, suppose cell A is a target BS, cell B is an interfering BS (alternatively, cell A is the interfering BS, and cell B is the target BS).

Referring to FIG. 19, in step 1905, the target BS selects at least one multiple access resource ID (or combination) and informs interfering BS. That is, the cell A may identify users coming from different cells, by determining and selecting $m_1^{th}$ ($0 < m_1 \leq N$) multiple access resource ID, based on load of the cell A. Alternatively, cell A may identify users within different cells, by selecting a combination of $m_1$ kinds of multiple access resource IDs. For example, when load of the cell A is greater (greater than a preset threshold), the cell A may select a multiple access resource ID (or combination) with a greater number of multiple access resources.

In step 1907, the target BS informs interfering BS. That is, the cell A may inform the cell B about information of selected multiple access resource ID, or combination of multiple access resource IDs.

In step 1909, the interfering BS receives multiple access resource ID (or combination) selected by the target BS, selects available multiple access resource ID (combination) of the interfering BS, based on a certain rule. That is, the cell B may select $m_1'^{th}$ ($0<m_1'\le m_1$) multiple access resource ID, or $m_1'^{th}$ combination of multiple access resource IDs from the received available multiple access resource IDs (or combination), based on load of cell B, so as to differentiate users within different cells; when network load is greater (greater than a preset threshold), cell B may select a multiple access resource ID (or combination) with a greater number of multiple access resources.

In step 1911, the target BS transmits a confirmation indication, and selected multiple access resource ID (combination). That is, cell B may inform cell A about a selected ID confirmation indication, and information of determined multiple access resource ID (or combination).

When the received available multiple access resource IDs (or ID combination) are not available in cell B, cell B may feedback an ID reselection indication to cell A.

In step 1913, the target receives confirmation indication, determines a multiple access resource set used by the cell, based on selected multiple access resource ID (combination), and inform adjacent BS. That is, after receiving the selected ID confirmation indication, cell A may select a set of multiple access resources (or combination) needed within cell A, based on the determined multiple access resource ID (or combination).

In step 1915, the target BS informs the interfering BS. That is, the target BS may inform cell B about the set information. When receiving the ID reselection indication, cell A re-selects $m_2^{th}$ ($0<m_2\le N-m_1$), or possible $m_2$ kinds of multiple access resource IDs (or ID combination), so as to differentiate users within various cells, and may inform cell B about foregoing information, until cells A and B determine a unified multiple access resource ID for users within different cells, or exceed the maximum interaction number, or have selected all the available multiple access resource IDs (or combinations).

In step 1917, the interfering BS receives information of multiple access resource set of the target BS, selects an available multiple access resource set of the interfering BS, based on a certain rule, and feeds back to target BS. That is, after receiving the multiple access resource set selected by the cell A, the cell B may select a multiple access resource set from the corresponding resource ID (or combination), based on a certain rule; in which the multiple access resource set selected by the cell B is orthogonal, semi-orthogonal, or non-orthogonal with multiple access resource set of the cell A.

In step 1919, the interfering BS informs the target BS. That is, cell B may inform cell A about the selected multiple access resource set.

In step 1921, the target BS receives information of multiple access resource set selected by interfering BS. That is, the cell A may receive the multiple access resource set selected by the interfering BS. Foregoing certain rule refers to: number of available orthogonal, semi-orthogonal, non-orthogonal multiple access resources, network loads, and so on.

a) When there is a sufficient number of available orthogonal multiple access resources, and network load is not so great (that is, not exceed a preset threshold), an orthogonal multiple access resource set may be selected.

b) When there is an insufficient number of available orthogonal multiple access resources, while there is a sufficient number of available semi-orthogonal multiple access resources; alternatively, there are sufficient numbers of available orthogonal and semi-orthogonal multiple access resources, however the network load is greater, semi-orthogonal multiple access resources may be selected.

c) When there are no sufficient numbers of available orthogonal or semi-orthogonal multiple access resource, however there is a sufficient number of available non-orthogonal multiple access resources, the non-orthogonal multiple access resources may be selected.

Until now, interaction process among cells is completed.

In addition, another interaction scheme is as follows. For two adjacent BSs with the same MA scheme, the target BS firstly selects a multiple access resource ID (or combination), and multiple access resource set thereof, based on load of the cell served by the target BS, and informs the adjacent BS. A configuration rule of an adjacent BS is as follows. On the precondition of meeting requirements of the cell, firstly configure the orthogonal multiple access resources with the target BS. And then, configure the semi-orthogonal multiple access resources with the target BS. Finally, configure the non-orthogonal multiple access resources with the target BS.

Figure 20:
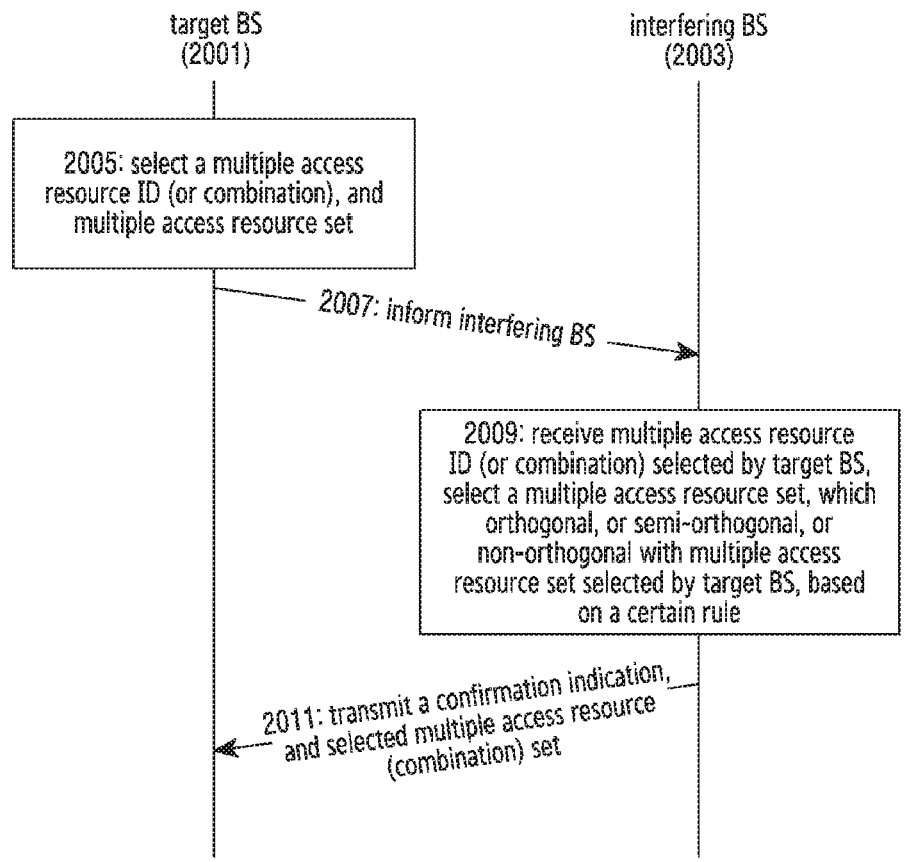
FIG. 20 illustrates a flowchart for representing a second method for determining a multiple access resource set, by exchanging information among adjacent cells, in a wireless communication system according to ninth embodiment of the present disclosure.

FIG. 20 illustrates a flowchart for representing a second method for determining a multiple access resource set, by exchanging information among adjacent cells, in a wireless communication system according to ninth embodiment of the present disclosure. FIG. 20 shows a method of operation of a target BS 2001 and an interfering BS 2003.

Referring to FIG. 20, in step 2005, the target BS selects a multiple access resource ID (or combination), and a multiple access resource set thereof.

In step 2007, the target BS informs the interfering BS. That is, the target BS may inform an interfering BS about the selection.

In step 2009, the interfering BS receives multiple access resource ID (or combination) selected by the target BS, selects a multiple access resource set, which is orthogonal, or semi-orthogonal, or non-orthogonal with the target BS, based on a certain rule. That is, the interfering BS may select the multiple access resource (or combination) set, based on foregoing configuration rule of adjacent BS.

In step 2011, the interfering BS transmits a confirmation indication and selected multiple access resource (combination) set. That is, the interfering BS may transmit a confirmation indication to the target BS, and inform the target BS about the multiple access resources (or combination) set selected by the interfering BS.

Embodiment 10

Foregoing embodiments describe configuration scheme of two adjacent cells. The configuration scheme of the present disclosure may be applied to a scene, where there are multiple adjacent cells, that is, there is a target cell and multiple interference cells. Specific configuration schemes have been described in each forgoing embodiment, which is not repeated here.

Figure 21:
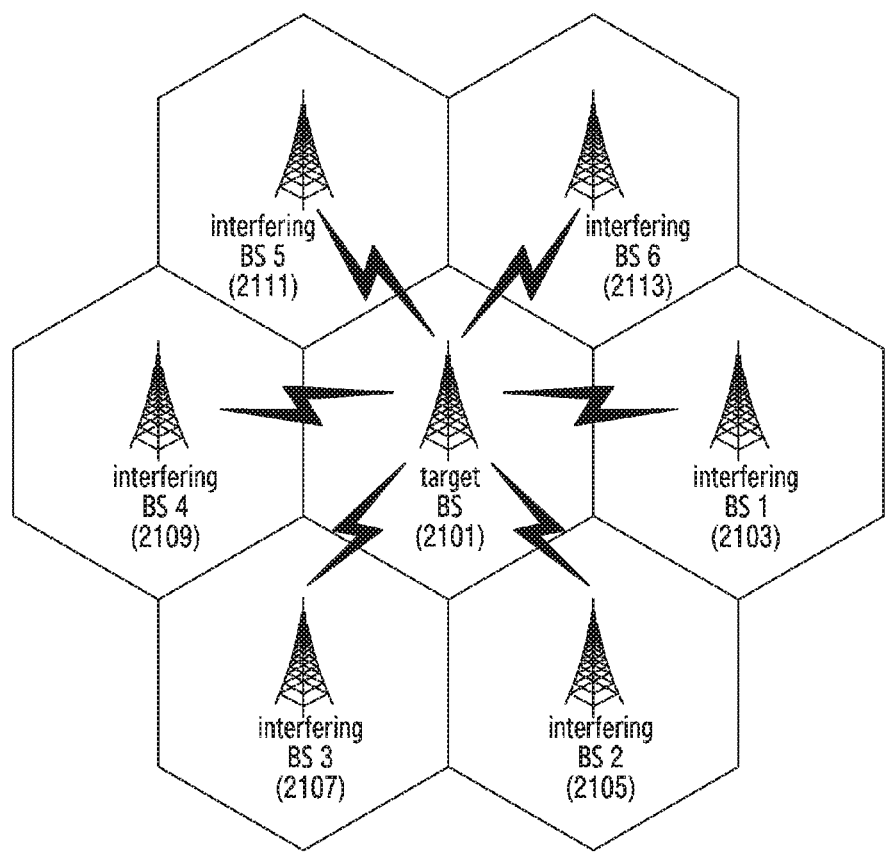
FIG. 21 illustrates a schematic diagram for representing a scene where there are multiple interfering BSs, in a wireless communication system according to tenth embodiment of the present disclosure.

FIG. 21 illustrates a schematic diagram for representing a scene where there are multiple interfering BSs, in a wireless communication system according to tenth embodiment of the present disclosure. FIG. 21 includes a target BS 2101 and interfering BS 1 2103 to 6 2113.

Referring to FIG. 21, the embodiment describes how to configure resources, when there are multiple adjacent cells, so as to suppress/cancel inter-cell interferences.

When there are multiple interfering BSs, the target BS 2101 may perform processes based on the following scheme:

1. Determine a multiple access resource ID (or combination) and set thereof, which is needed by a cell served by the target BS, and meanwhile inform adjacent $N_{cell}$ BSs. As shown in FIG. 21, $N_{cell}=6$.
2. After receiving the multiple access resource ID (or combination) and set thereof, which is selected by the target BS, on the precondition of meeting requirements of users within the cell, adjacent multiple interfering BSs firstly select an available multiple access resource (or combination) set, which is orthogonal with the multiple access resource (or combination) set selected by the target BS, and then select a semi-orthogonal multiple access resource (or combination) set, and finally select a non-orthogonal multiple access resource (or combination) set.
3. Adjacent multiple interfering BSs inform the target BS about information of respectively selected multiple access resource (or combination) set.

Alternatively, the target BS may perform processes based on the following scheme:

1. Determine at least one multiple access resource ID (or combination), which may meet requirements of a cell served by the target BS, and inform adjacent $N_{cell}$ BSs.
2. After receiving available multiple access resource IDs (or combinations) from the target BS, adjacent $N_{cell}$ interfering BSs respectively select at least one multiple access resource ID (or combination) therefrom, which may meet requirements of users within respective cell, and feed back to the target BS.
3. After obtaining selections of adjacent BSs, the target BS determines the ID (or combination) of multiple access resource used by the cell, determines the selected multiple access resource (or combination) set, and informs adjacent interfering BSs about foregoing information.
4. After receiving the multiple access resource ID (or combination), which is determined by the target BS, on the precondition of meeting requirements of a cell served by the interfering BS, an interfering BS firstly selects a multiple access resource (or combination) set, which is orthogonal with the multiple access resource (or combination) set selected by the target BS, and then selects a semi-orthogonal multiple access resource (or combination) set, finally selects a non-orthogonal multiple access resource (or combination) set, and informs the target BS about information of multiple access resource (or combination) set, which is selected by the interfering BS.

In addition, when there are multiple interfering BSs, the following methods may be adopted to process the inter-cell interference, when a system adopts a grant-based scheme:

1. An interfering BS transmits an interference indication to a target BS, and informs the target BS about multiple access resources and/or DMRS resources, which are used by interfering users served by the interfering BS.
2. The target BS receives the interference indication, multiple access resources and DMRS resources of interfering users, which are transmitted by the interfering BS.
3. After receiving a combined signal coming from users of a cell and interfering users of an adjacent cell, in which the cell is served by the target BS, the target BS performs a joint detection and decoding to the users of the cell and users of the adjacent cell, by using multiple access resources and DMRS information of users within the cell, and multiple access resources and DMRS information of interfering users, and then the target BS obtains data of users within the cell.

When the system adopts a grant-free transmission:

1. When the grant-free scheme is to freely select resources by a user, a BS informs the user about information of an available multiple access resource set, by using a downlink channel (including: a physical broadcast channel, a PDCCH, a PDSCH, and so on), and the user selects used bit-level interleave pattern and grid-mapping pattern from the resource set, the interfering BS informs the target BS about information of multiple access resource set and DMRS resource of the cell, which is served by the interfering BS; the target BS performs a joint detection and decoding to a combined signal, which comes from users within the cell and interfering users of adjacent cells, by using the multiple access resource set information and DMRS resource information of the cell, and multiple access resource set and DMRS resources information of adjacent interference cells, and at this time, the foregoing detection is a blind detection. Finally, the target BS detects signals of users within the cell, and then objectives of interference cancellation may be achieved.
2. When the grant-free scheme is to allocate resources by a BS, the BS allocates needed multiple access resources and DMRS resources for a user, and informs the user with a downlink channel (including: a physical broadcast channel, a PDCCH, a PDSCH, and so on). Meanwhile, the interfering BS informs the target BS about an interference indication. Based on multiple access resources and DMRS resources of possible interfering users, the target BS performs a joint detection and decoding to a combined signal, which comes from users within the cell and interfering users of adjacent cells, by using configuration information of multiple access resources and DMRS resource information of the cell, and configuration information of multiple access resources and DMRS resource information coming from adjacent interfering cells. At this time, the foregoing detection is a blind detection. Finally, the target BS detects signals of users within the cell, and objectives of interference cancellation may be achieved.

Figure 22:
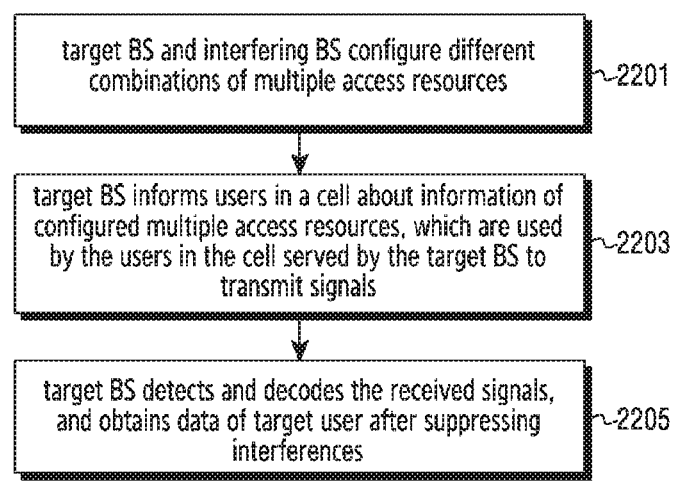
FIG. 22 illustrates a flowchart for representing a method for suppressing an inter-cell interference, in a wireless communication system according to various embodiment of the present disclosure.

FIG. 22 illustrates a flowchart for representing a method for suppressing an inter-cell interference, in a wireless communication system according to various embodiment of the present disclosure. FIG. 22 shows a method of operation of the target BS 510 and interfering BS 520.

Referring to FIG. 22, in step 2201, the target BS and interfering BS configure different combinations of multiple access resources. That is, the target BS and the interfering BS may be configured with different multiple access resource sets.

In step 2203, the target BS informs users in a cell about information of configured multiple access resources, which are used by the users in the cell served by the target BS to transmit signals. That is, the target BS may inform users within a cell about information of configured multiple access resources, which are adopted by the users within the cell to transmit signals, and the cell is served by the target BS.

In step 2205, the target BS performs detection and decoding to a received signal, and obtains data of a target user after suppressing interferences.

Based on foregoing technical solutions, it can be seen that in the method provided by the present disclosure, which configures multiple access resources so as to reduce or even cancel an inter-cell interference, after exchanging information among cells, firstly determine a multiple access resource ID used by an adjacent BS to differentiate users within various cells, and configure a corresponding multiple access resource set; by using special properties of MA scheme, such as orthogonal grid-mapping patterns, the inter-cell interference may be reduced or cancelled, by reasonably configuring multiple access resources. Subsequently, for other MA schemes, the target BS performs a joint detection and decoding to a combined signal, which comes from users within the cell and users of interference cells, based on configuration information of multiple access resources coming from the interfering BS, and finally decodes data information of the target user. And then, interference cancellation may be achieved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a base station (BS), comprising:
    transmitting, to a terminal served by the BS, information regarding a first time-frequency resource used for the terminal served by the BS;
    receiving, from an adjacent BS, interference information and information regarding a second time-frequency resource used for a terminal served by the adjacent BS, wherein the second time-frequency resource is a time-frequency resource overlapped with the first time-frequency resource;
    performing a decoding of a combined signal comprising first data from the terminal served by the BS and second data from the terminal served by the adjacent BS on the overlapped time-frequency resource, based on the interference information and the information regarding the second time-frequency resource; and
    identifying the first data from the combined signal based on a result of the decoding,
    wherein the interference information indicates an interference on the first time-frequency resource by the terminal served by the adjacent BS.

2. The method according to claim 1, further comprising:
    if there are N multiple access resource identities (IDs) in a multiple access (MA) scheme used by the BS and the adjacent BS,
    configuring different $n^{th}$ multiple access resource ID sets for the BS and the adjacent BS, so as to differentiate a cell to which a user belongs; and
    configuring different m combination sets of multiple access resource ID for the BS and the adjacent BS, so as to differentiate the cell to which the user belongs,
    wherein N is greater than or equal to 1,
    wherein $0<n\leq N$, and
    wherein $0<m\leq N$.

3. The method of claim 2, wherein the configuring of different $n^{th}$ multiple access resource ID sets for the BS and the adjacent BS comprises:
    configuring orthogonal multiple access resources for the BS and the adjacent BS;
    configuring semi-orthogonal multiple access resources for the BS and the adjacent BS if there is no orthogonal multiple access resource; and
    configuring non-orthogonal multiple access resources for the BS and the adjacent BS if there is no orthogonal multiple access resource and semi-orthogonal multiple access resource.

4. The method of claim 3, wherein the first data is obtained by processing a same data with two different multiple access resources, the two different multiple access resources are orthogonal multiple access resources, if time-frequency resource elements (REs) occupied by data are not overlapped at all,
    wherein the first data is obtained after processing the same data with two different multiple access resources, the two different multiple access resources are semi-orthogonal multiple access resources, if REs occupied by data are partially-overlapped, and
    wherein the first data is obtained after processing the same data with two different multiple access resources, the two different multiple access resources are non-orthogonal multiple access resources, if REs occupied by data are completely overlapped.

5. The method of claim 2, wherein the configuring of different m combination sets of multiple access resource ID for the BS and the adjacent BS comprises:
    configuring an orthogonal multiple access resource combination for the BS and the adjacent B S;
    configuring a semi-orthogonal multiple access resource combination for the BS and the adjacent BS, if there is no orthogonal multiple access resource combination; and
    configuring a non-orthogonal multiple access resource combination for the BS and the adjacent BS, if there is no orthogonal multiple access resource combination, and semi-orthogonal multiple access resource combination.

6. The method of claim 5, wherein the first data is obtained after processing a same data with two different combinations of multiple access resources, the two different combinations of multiple access resources are orthogonal multiple access resource combinations, if REs occupied by data are not overlapped at all,
    wherein the first data is obtained after processing the same data with two different combinations of multiple access resources, the two different combinations of multiple access resources are semi-orthogonal multiple access resource combinations, if REs occupied by data are partially-overlapped, and
    wherein the first data is obtained after processing the same data with two different combinations of multiple access resources, the two different combinations of multiple access resources are non-orthogonal multiple access resource combinations, if REs occupied by data are completely overlapped.

7. The method of claim 1, wherein the performing of the decoding comprises performing a joint detection and decoding to the combined signal, and
    wherein the identifying the first data comprises identifying the first data from the combined signal based on a resource of the joint detection and decoding.

8. The method of claim 2, further comprising:
    selecting, by the BS, a $m_1^{th}$ multiple access resource ID, or a combination of the $m_1^{th}$ multiple access resource ID, based on a preset condition;
    informing, by the BS, the adjacent BS of the selected multiple access resource ID or combination of multiple access resource IDs, if the $m_1^{th}$ multiple access resource ID or the combination of $m_1^{th}$ multiple access resource IDs selected by the BS is available for the adjacent BS, wherein the adjacent BS transmits a selected ID confirmation indication to the BS, if the multiple access resource ID or combination of multiple access resource IDs selected by the BS is not available for the adjacent BS, wherein the adjacent BS transmits an ID reselection indication to the BS;

receiving the selected ID confirmation indication from the adjacent BS, selecting, by the BS, a corresponding multiple access resource or combination set of multiple access resources, based on the selection of the $m_1^{th}$ multiple access resource ID, or a combination of the $m_1^{th}$ multiple access resource ID;

informing the adjacent BS about set information; and after receiving the ID reselection indication from the adjacent BS, modifying, by the BS, value of $m_1$, and returning back to selecting the $m_1^{th}$ multiple access resource ID, or a combination of the $m_1^{th}$ multiple access resource ID, until the BS receives the selected ID confirmation indication from the adjacent BS, or, until an interaction number between the BS and the adjacent BS has exceeded a preset maximum interaction number;

wherein the adjacent BS selects a multiple access resource or a combination set of multiple access resources, which is orthogonal, semi-orthogonal, or non-orthogonal with the multiple access resource or the combination set of multiple access resources selected by the BS, based on the multiple access resource or combination set of multiple access resources selected by the BS, and wherein $0 < m_1 \le N$.

9. The method of claim 2, further comprising:

selecting, by the BS, a multiple access resource ID and a multiple access resource set; and informing, by the BS, the adjacent BS about information of the selected multiple access resource ID and multiple access resource set, wherein the adjacent BS selects a multiple access resource set, which is orthogonal, semi-orthogonal, or non-orthogonal with the multiple access resource set selected by the BS, based on the multiple access resource ID and multiple access resource set selected by the BS, wherein the adjacent BS informs the BS about the selected information of the selected multiple access resource ID and multiple access resource set;

selecting, by the BS, a multiple access resource ID combination, and a combination set of multiple access resources; and informing, by the BS, the adjacent BS about information of the selected multiple access resource ID combination and combination set of multiple access resources, wherein the adjacent BS selects a combination set of multiple access resources, which is orthogonal, semi-orthogonal, or non-orthogonal with the combination set of multiple access resources selected by the adjacent BS, based on the multiple access resource ID combination and combination set of multiple access resources selected by the BS, and wherein the adjacent BS informs, the BS of the selected information of the selected multiple access resource ID and multiple access resource set.

10. The method of claim 2, wherein the multiple access resource ID comprises at least one of a time-frequency resource, a codebook resource, an interleave pattern resource, a grid-mapping pattern resource, a complex spreading code, a codebook matrix sequence, or a demodulation reference signal (DMRS) resource.

11. An apparatus of a base station(BS), the apparatus comprising:

a transceiver configured to:

transmit, to a terminal served by the BS, information regarding a first time-frequency resource used for the terminal served by the BS, receive, from an adjacent BS, interference information and information regarding a second time-frequency resource used for a terminal served by the adjacent BS, wherein the second time-frequency resource is a time-frequency resource overlapped with the first time-frequency resource, and perform a decoding of a combined signal comprising first data from the terminal served by the BS and second data from the terminal served by the adjacent BS on the overlapped time-frequency resource, based on the interference information and the information regarding the second time-frequency resource; and at least one processor configured to identify the first data from the combined signal based on a result of the decoding, wherein the interference information indicates an interference on the first time-frequency resource by the terminal served by the adjacent BS.

12. The apparatus of claim 11, wherein the at least one processor is further configured to:

if there are N multiple access resource identities (IDs) in a multiple access (MA) scheme used by the BS and the adjacent BS, configure different $n^{th}$ multiple access resource ID sets for the BS and the adjacent BS, so as to differentiate a cell to which a user belongs, and configure different m combination sets of multiple access resource ID for the BS and the adjacent BS, so as to differentiate the cell to which the user belongs, wherein N is greater than or equal to 1, wherein $0 < n \le N$, and wherein $0 < m \le N$.

13. The apparatus of claim 12, wherein the at least one processor is further configured to:

configure orthogonal multiple access resources for the BS and the adjacent BS, configure semi-orthogonal multiple access resources for the BS and the adjacent BS, if there is no orthogonal multiple access resource, and configure non-orthogonal multiple access resources for the BS and the adjacent BS, if there is no orthogonal multiple access resource and semi-orthogonal multiple access resource.

14. The apparatus of claim 13, wherein the first data is obtained by processing a same data with two different multiple access resources, the two different multiple access resources are orthogonal multiple access resources, if time-frequency resource elements (REs) occupied by data are not overlapped at all, wherein the first data is obtained after processing the same data with two different multiple access resources, the two different multiple access resources are semi-orthogonal multiple access resources, if REs occupied by data are partially-overlapped, and wherein the first data is obtained after processing the same data with two different multiple access resources, the two different multiple access resources are non-orthogonal multiple access resources, if REs occupied by data are completely overlapped.

15. The apparatus of claim 12, wherein the at least one processor is further configured to:
configure an orthogonal multiple access resource combination for the BS and the adjacent BS,
configure a semi-orthogonal multiple access resource combination for the BS and the adjacent BS, if there is no orthogonal multiple access resource combination, and
configure a non-orthogonal multiple access resource combination for the BS and the adjacent BS, if there is no orthogonal multiple access resource combination, and semi-orthogonal multiple access resource combination.

16. The apparatus of claim 15, wherein the first data is obtained after processing a same data with two different combinations of multiple access resources, the two different combinations of multiple access resources are orthogonal multiple access resource combinations, if REs occupied by data are not overlapped at all,
wherein the first data is obtained after processing the same data with two different combinations of multiple access resources, the two different combinations of multiple access resources are semi-orthogonal multiple access resource combinations, if REs occupied by data are partially-overlapped, and
wherein the first data is obtained after processing the same data with two different combinations of multiple access resources, the two different combinations of multiple access resources are non-orthogonal multiple access resource combinations, if REs occupied by data are completely overlapped.

17. The apparatus of claim 11, wherein the transceiver is further configured to perform a joint detection and decoding to the combined signal, and
wherein the at least one processor is further configured to identify the first data from the combined signal based on a resource of the joint detection and decoding.

18. The apparatus of claim 12, wherein the at least one processor is configured to:
select, by the BS, $m_1^{th}$ multiple access resource ID, or a combination of the $m_1^{th}$ multiple access resource ID, based on a preset condition,
control to inform, by the BS, the adjacent BS of the selected multiple access resource ID or combination of multiple access resource IDs,
if the multiple access resource ID or combination of multiple access resource IDs selected by the BS is available for the adjacent BS, wherein the adjacent BS transmits a selected ID confirmation indication to the BS,
if the multiple access resource ID or combination of multiple access resource IDs selected by the BS is not available for the adjacent BS, and wherein the adjacent BS transmits an ID reselection indication to the BS,
control to receive the selected ID confirmation indication from the adjacent BS,
select, by the BS, a corresponding multiple access resource or combination set of multiple access resources, based on the selection of $m_1^{th}$ multiple access resource ID, or a combination of the $m_1^{th}$ multiple access resource ID,
control to inform the adjacent BS about set information, and
modify, by the BS, value of $m_1$, and returning back to selecting the $m_1^{th}$ multiple access resource ID, or a combination of the $m_1^{th}$ multiple access resource ID, until the BS receives the selected ID confirmation indication from the adjacent BS, or, until an interaction number between the BS and the adjacent BS has exceeded a preset maximum interaction number after receiving the ID reselection indication from the adjacent BS,
wherein the adjacent BS selects a multiple access resource or a combination set of multiple access resources, which is orthogonal, semi-orthogonal, or non-orthogonal with the multiple access resource or the combination set of multiple access resources selected by the BS, based on the multiple access resource or combination set of multiple access resources selected by the BS, and wherein $0 < m_1 \leq N$.

19. The apparatus of claim 12, wherein the at least one processor is further configured to:
select, by the BS, a multiple access resource ID and a multiple access resource set,
control to inform, by the BS, the adjacent BS about information of the selected multiple access resource ID and multiple access resource set, wherein the adjacent BS selects a multiple access resource set, which is orthogonal, semi-orthogonal, or non-orthogonal with the multiple access resource set selected by the BS, based on the multiple access resource ID and multiple access resource set selected by the BS, and wherein the adjacent BS informs the BS about the selected information of the selected multiple access resource ID and multiple access resource set,
select, by the BS, a multiple access resource ID combination, and a combination set of multiple access resources,
control to inform, by the BS, the adjacent BS about information of the selected multiple access resource ID combination and combination set of multiple access resources,
wherein the adjacent BS selects a combination set of multiple access resources, which is orthogonal, semi-orthogonal, or non-orthogonal with the combination set of multiple access resources selected by the BS, based on the multiple access resource ID combination and combination set of multiple access resources selected by the BS, and
wherein the adjacent BS informs the BS of the selected information of the selected multiple access resource ID and multiple access resource set.

20. The apparatus of claim 12, wherein the multiple access resource ID comprises at least one of
a time-frequency resource, a codebook resource, an interleave pattern resource, a grid-mapping pattern resource, a complex spreading code, a codebook matrix sequence, or a demodulation reference signal (DMRS) resource.

* * * * *